US011902217B2

(12) United States Patent
Grant et al.

(10) Patent No.: US 11,902,217 B2
(45) Date of Patent: Feb. 13, 2024

(54) CROSS-CARRIER SPATIAL RELATION INDICATION FOR SEMI-PERSISTENT SOUNDING REFERENCE SIGNAL (SP-SRS) RESOURCES

(71) Applicant: Telefonaktiebolaget LM Ericsson (publ), Stockholm (SE)

(72) Inventors: Stephen Grant, Pleasanton, CA (US); Sebastian Faxér, Järfälla (SE); Claes Tidestav, Bålsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/959,409

(22) Filed: Oct. 4, 2022

(65) Prior Publication Data
US 2023/0027691 A1    Jan. 26, 2023

Related U.S. Application Data

(63) Continuation of application No. 16/478,643, filed as application No. PCT/SE2019/050295 on Apr. 1, 2019, now Pat. No. 11,496,279.
(Continued)

(51) Int. Cl.
*H04L 5/00* (2006.01)
*H04B 7/06* (2006.01)
*H04W 72/044* (2023.01)

(52) U.S. Cl.
CPC ......... *H04L 5/0098* (2013.01); *H04B 7/0617* (2013.01); *H04B 7/0695* (2013.01);
(Continued)

(58) Field of Classification Search
CPC ... H04L 5/0098; H04L 5/0051; H04L 5/0092; H04B 7/0617; H04B 7/0695; H04W 72/046
See application file for complete search history.

(56) References Cited

U.S. PATENT DOCUMENTS 9,137,736 B2   9/2015 Seo et al.
9,559,820 B2   1/2017 Geirhofer et al.
(Continued)

FOREIGN PATENT DOCUMENTS

CN   102450073 A   5/2012
EP    2747331 A1   6/2014
(Continued)

OTHER PUBLICATIONS

"DraftCR to 38.214 capturing the Jan. 18 ad-hoc and RAN1 #92 meeting agreements", 3GPP TSG-RAN1 Meeting #92, R1-1803555, Athens, Feb. 26-Mar. 1, 2018, pp. 1-78.
(Continued)

*Primary Examiner* — Ricky Q Ngo
*Assistant Examiner* — Stephen N Steiner
(74) *Attorney, Agent, or Firm* — Murphy, Bilak & Homiller, PLLC

(57) ABSTRACT

Embodiments include methods for a network node to activate semi-persistent sounding reference signal (SP-SRS) resources for transmission by a user equipment (UE). Such methods include sending, to the UE, a control message comprising configuration of a set of SP-SRS resources associated with a particular serving cell of the wireless communication network. Such methods include sending to the UE a further control message for activating the configured set of SP-SRS resources. The further control message includes information identifying an SP-SRS resource of the set of SP-SRS resources to be activated, and an indication of the identified SP-SRS resource's spatial relation with a further resource that is not associated with the particular serving cell. The indication comprising an identity of a further serving cell that is different from the particular serving cell and that is associated with the further resource. Other embodiments include complementary methods for a UE.

20 Claims, 8 Drawing Sheets

Related U.S. Application Data

(60) Provisional application No. 62/660,738, filed on Apr. 20, 2018.

(52) U.S. Cl.
CPC .......... H04L 5/0051 (2013.01); H04L 5/0092 (2013.01); H04W 72/046 (2013.01); H04L 5/001 (2013.01)

(56) References Cited

U.S. PATENT DOCUMENTS

| | | | |
|---|---|---|---|
| 9,635,654 | B2 | 4/2017 | Hwang et al. |
| 2008/0311913 | A1 | 12/2008 | Thiebaut et al. |
| 2011/0310818 | A1 | 12/2011 | Lin et al. |
| 2013/0010611 | A1 | 1/2013 | Wiemann et al. |
| 2015/0271744 | A1 | 9/2015 | Liu et al. |
| 2018/0212800 | A1* | 7/2018 | Park ...................... H04L 5/0057 |
| 2019/0110210 | A1 | 4/2019 | Takeda et al. |
| 2019/0174466 | A1 | 6/2019 | Zhang et al. |
| 2019/0306847 | A1 | 10/2019 | Seo et al. |
| 2019/0380133 | A1 | 12/2019 | Tang |
| 2020/0053721 | A1 | 2/2020 | Cheng et al. |
| 2020/0267571 | A1* | 8/2020 | Park ...................... H04L 5/0051 |
| 2020/0267661 | A1 | 8/2020 | Park et al. |
| 2021/0091827 | A1 | 3/2021 | Namba et al. |

FOREIGN PATENT DOCUMENTS

| | | |
|---|---|---|
| EP | 3276849 A4 | 4/2018 |
| JP | 2017510225 A | 4/2017 |
| JP | 2019118036 A | 7/2019 |
| JP | 2019535171 A | 12/2019 |
| KR | 20180035719 A | 4/2018 |
| RU | 2458472 C2 | 8/2012 |
| WO | 2016159712 A1 | 10/2016 |
| WO | 2017026794 A1 | 2/2017 |
| WO | 2017146535 A1 | 8/2017 |
| WO | 2017164220 A1 | 9/2017 |
| WO | 2018016907 A1 | 1/2018 |
| WO | 2018030864 A1 | 2/2018 |
| WO | 2018031664 A1 | 2/2018 |
| WO | 2018053814 A1 | 3/2018 |

OTHER PUBLICATIONS

"New MAC CEs for NR MIMO", 3GPP TSG-RAN WG2 Meeting #101, R2-1802418, Athens, Greece, Feb. 26-Mar. 2, 2018, pp. 1-18.

"Discussion on QCL", 3GPP TSG RAN WG1 NR Ad-Hoc #3, R1-1716410, revision of R1-1713414, Nagoya, Japan, Sep. 18-21, 2017, pp. 1-3.

"Draft Report of 3GPP TSG RAN WG1 #92bis v0.1.0; (Sanya, China, Apr. 16-20, 2018)", 3GPP TSG RAN WG1 Meeting #93; Busan, South Korea, May 21-25, 2018; R1-180xxxx, May 21-25, 2018, pp. 1-31.

"LS on UL cross carrier beam indication", 3GPP TSG RAN WG1 Meeting #92bis; R1-1805627; Sanya, China,, Apr. 16-20, 2018, 1 page.

"Remaining issues on beam measurement and reporting", 3GPP TSG-RAN WG1 Meeting #93; Tdoc R1-1806217; Busan, Korea, May 21-25, 2018, pp. 1-13.

"Summary of QCL", 3GPP TSG RAN WG1 Meeting #91, R1-1721429, Reno, Nevada, USA, Nov. 27-Dec. 1, 2017, pp. 1-22.

"3GPP TS 38.401 V15.1.0", 3rd Generation Partnership Project; Technical Specification Group Radio Access Network; NG-RAN; Architecture description (Release 15), Mar. 2018, pp. 1-23.

"3GPP TS 38.211 V15.1.0", 3rd Generation Partnership Project; Technical Specification Group Radio Access Network; NR; Physical channels and modulation (Release 15), Mar. 2018, pp. 1-90.

"3GPP TS 38.213 V15.0.0", 3rd Generation Partnership Project; Technical Specification Group Radio Access Network; NR; Physical layer procedures for control (Release 15), Dec. 2017, pp. 1-56.

"3GPP TS 38.214 V15.1.0", 3rd Generation Partnership Project; Technical Specification Group Radio Access Network; NR; Physical layer procedures for data (Release 15), Mar. 2018, pp. 1-77.

"3GPP TS 38.214 V15.5.0", 3rd Generation Partnership Project; Technical Specification Group Radio Access Network; NR; Physical layer procedures for data (Release 15), Mar. 2019, pp. 1-103.

"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.

"3GPP TS 33.401 V15.3.0", 3rd Generation Partnership Project; Technical Specification Group Services and System Aspects; 3GPP System Architecture Evolution (SAE); Security architecture (Release 15), Mar. 2018, pp. 1-163.

"3GPP TS 38.331 V15.1.0", 3rd Generation Partnership Project; Technical Specification Group Radio Access Network; NR; Radio Resource Control (RRC) protocol specification (Release 15), Mar. 2018, pp. 1-268.

"3GPP 38.321 V15.1.0", 3rd Generation Partnership Project; Technical Specification Group Radio Access Network; NR; Medium Access Control (MAC) protocol specification (Release 15), Mar. 2018, pp. 1-67.

"Some corrections on beam management MAC CE", 3GPP TSG-RAN WG2 Meeting#101bis, R2-1804675, Sanya, China, Apr. 16-20, 2018, pp. 1-4.

"Summary of offline on MAC CEs definition for NR MIMO", 3GPP TSG-RAN WG2 #101, R2-1803971, Athens, Greece, Feb. 26-Mar. 2, 2018, pp. 1-14.

"Introduction of MAC CEs for NR MIMO", 3GPP TSG-RAN WG2 #101; R2-1803796; Athens, Greece, Feb. 26-Mar. 2, 2018, pp. 1-11.

* cited by examiner

| A/D | Serving Cell ID | | | BWP ID | Oct 1 |
|---|---|---|---|---|---|
| R | R | R | SUL | SP SRS Resource Set ID | Oct 2 |
| $F_0$ | Resource ID $_0$ | | | | Oct 3 |
| ⋮ | | | | | |
| $F_{N-3}$ | Resource ID $_{N-3}$ | | | | Oct N |

*FIG. 2*

| A/D | Serving Cell ID | | | BWP ID | 1 |
|---|---|---|---|---|---|
| R | R | R | SUL | SP-SRS Resource Set ID | 2 |
| $F_0$ | Resource ID$_0$ | | | | 3 |
| ⋮ | | | | | |
| $F_{N-3}$ | Resource ID$_{N-3}$ | | | | N |
| Target CC/BWP ID for Resource ID$_0$ | | Target CC/BWP ID for Resource ID$_1$ | | | N+1 |
| ⋮ | | | | | |
| Target CC/BWP ID for Resource ID$_{N-4}$ | | Target CC/BWP ID for Resource ID$_{N-3}$ | | | N+(N-3)/2 |

*FIG. 3*

| A/D | Serving Cell ID | | | BWP ID | 1 |
|---|---|---|---|---|---|
| R | R | R | SUL | SP-SRS Resource Set ID | 2 |
| $F_0$ | Resource $ID_0$ | | | | 3 |
| ⋮ | | | | | |
| $F_{N-3}$ | Resource $ID_{N-3}$ | | | | N |
| CC/BWP ID for all Resource IDs 0 … N-3 | | | | | N+1 |

*FIG. 4*

| A/D | Serving Cell ID | | | BWP ID | 1 |
|---|---|---|---|---|---|
| R | R | R | SUL | SP-SRS Resource Set ID | 2 |
| $F_0$ | Resource $ID_0$ | | | | 3 |
| ⋮ | | | | | |
| $F_{N-3}$ | Resource $ID_{N-3}$ | | | | N |
| CC/BWP ID | | | | | N+1 |
| Bitmap - CC/BWP ID vs. Resource $ID_{0…N-3}$ | | | | | N+2, etc. |

*FIG. 5*

| A/D | Serving Cell ID | | BWP ID | 1 |
|---|---|---|---|---|
| R | CC/BWP ID | SUL | SP-SRS Resource Set ID | 2 |
| $F_0$ | Resource $ID_0$ | | | 3 |
| ⋮ | ⋮ | | | |
| $F_{N-3}$ | Resource $ID_{N-3}$ | | | N |

FIG. 6

| A/D | Serving Cell ID | | BWP ID | 1 |
|---|---|---|---|---|
| CC/BWP Index | | SUL | SP-SRS Resource Set ID | 2 |
| $F_0$ | Resource $ID_0$ | | | 3 |
| ⋮ | ⋮ | | | |
| $F_{N-3}$ | Resource $ID_{N-3}$ | | | N |

FIG. 7

| A/D | Serving Cell ID | | | BWP ID | 1 |
|---|---|---|---|---|---|
| R | R | RS/TCI | SUL | SP-SRS Resource Set ID | 2 |
| $F_0$ | Resource $ID_0$ / TCI State $ID_0$ | | | | 3 |
| ⋮ | ⋮ | | | | |
| $F_{N-3}$ | Resource $ID_{N-3}$ / TCI State $ID_{N-3}$ | | | | N |

FIG. 8

| A/D | Serving Cell ID | | | BWP ID | 1 |
|---|---|---|---|---|---|
| R | R | RS/PSR | SUL | SP-SRS Resource Set ID | 2 |
| $F_0$ | Resource $ID_0$ / PUCCH Spat. Rel. $Index_0$ | | | | 3 |
| ⋮ | ⋮ | | | | |
| $F_{N-3}$ | Resource $ID_{N-3}$ / PUCCH Spat. Rel. $Index_{N-3}$ | | | | N |

*FIG. 9*

| A/D | Serving Cell ID | | | BWP ID | 1 |
|---|---|---|---|---|---|
| R | R | RS/SSR | SUL | SP-SRS Resource Set ID | 2 |
| $F_0$ | Resource $ID_0$ / SRS Spat. Rel. $Index_0$ | | | | 3 |
| ⋮ | ⋮ | | | | |
| $F_{N-3}$ | Resource $ID_{N-3}$ / SRS Spat. Rel. $Index_{N-3}$ | | | | N |

*FIG. 10*

CROSS-CARRIER SPATIAL RELATION INDICATION FOR SEMI-PERSISTENT SOUNDING REFERENCE SIGNAL (SP-SRS) RESOURCES

TECHNICAL FIELD

The present invention generally relates to wireless communication networks, and particularly relates to efficient configuration of spatial relations for reference signal (RS) resources used in communication between a user equipment (UE) and a network node in a wireless communication network.

BACKGROUND

Wireless communication has evolved rapidly in the past decades as a demand for higher data rates and better quality of service has been continually required by a growing number of end users. Next-generation (so-called "5G") cellular systems are expected to operate at higher frequencies (e.g., millimeter-wavelength or "mmW") such as 5-300 GHz. Such systems are also expected to utilize a variety of multi-antenna technology (e.g., antenna arrays) at the transmitter, the receiver, or both. In the field of wireless communications, multi-antenna technology can comprise a plurality of antennas in combination with advanced signal processing techniques (e.g., beamforming). Multi-antenna technology can be used to improve various aspects of a communication system, including system capacity (e.g., more users per unit bandwidth per unit area), coverage (e.g., larger area for given bandwidth and number of users), and increased per-user data rate (e.g., in a given bandwidth and area). Directional antennas can also ensure better wireless links as a mobile or fixed device experiences a time-varying channel.

The availability of multiple antennas at the transmitter and/or the receiver can be utilized in different ways to achieve different goals. For example, multiple antennas at the transmitter and/or the receiver can be used to provide additional diversity against radio channel fading. To achieve such diversity, the channels experienced by the different antennas should have low mutual correlation, e.g., a sufficiently large antenna spacing ("spatial diversity") and/or different polarization directions ("polarization diversity"). Historically, the most common multi-antenna configuration has been the use of multiple antennas at the receiver side, which is commonly referred to as "receive diversity." Alternately and/or in addition, multiple antennas can be used in the transmitter to achieve transmit diversity. A multi-antenna transmitter can achieve diversity even without any knowledge of the channels between the transmitter and the receiver, so long as there is low mutual correlation between the channels of the different transmit antennas.

In various wireless communication systems, such as cellular systems, there can be fewer constraints on the complexity of the base station (also referred to herein as network node, NodeB (NB), and evolved NodeB (eNB), and next-generation NodeB (gNB)) compared to the terminal (also referred to herein as user equipment (UE), wireless communication device, and mobile unit). In such exemplary cases, a transmit diversity may be feasible in the downlink (i.e., base station to terminal) only and, in fact, may provide a way to simplify the receiver in the terminal. In the uplink (i.e., terminal to base station) direction, due to a complexity of multiple transmit antennas, it may be preferable to achieve diversity by using a single transmit antenna in the terminal multiple receive antennas at the base station. Nevertheless, it is expected that in 5G systems, certain operating configurations will utilize multiple antennas at both the terminal and the base station.

In other exemplary configurations, multiple antennas at the transmitter and/or the receiver can be used to shape or "form" the overall antenna beam (e.g., transmit and/or receive beam, respectively) in a certain way, with the general goal being to improve the received signal-to-interference-plus-noise ratio (SINR) and, ultimately, system capacity and/or coverage. This can be done, for example, by maximizing the overall antenna gain in the direction of the target receiver or transmitter or by suppressing specific dominant interfering signals. In general, beamforming can increase the signal strength at the receiver in proportion to the number of transmit antennas. Beamforming can be based either on high or low fading correlation between the antennas. High mutual antenna correlation can typically result from a small distance between antennas in an array. In such exemplary conditions, beamforming can boost the received signal strength but does not provide any diversity against radio-channel fading. On the other hand, low mutual antenna correlation typically can result from either a sufficiently large inter-antenna spacing or different polarization directions in the array. If some knowledge of the downlink channels of the different transmit antennas (e.g., the relative channel phases) is available at the transmitter, multiple transmit antennas with low mutual correlation can both provide diversity, and also shape the antenna beam in the direction of the target receiver and/or transmitter.

In other exemplary configurations, multiple antennas at both the transmitter and the receiver can further improve the SINR and/or achieve an additional diversity against fading compared to only multiple receive antennas or multiple transmit antennas. This can be useful in relatively poor channels that are limited, for example, by interference and/or noise (e.g., high user load or near cell edge). In relatively good channel conditions, however, the capacity of the channel becomes saturated such that further improving the SINR provides limited increases in capacity. In such cases, using multiple antennas at both the transmitter and the receiver can be used to create multiple parallel communication "channels" over the radio interface. This can facilitate a highly efficient utilization of both the available transmit power and the available bandwidth resulting in, e.g., very high data rates within a limited bandwidth without a disproportionate degradation in coverage. For example, under certain exemplary conditions, the channel capacity can increase linearly with the number of antennas and avoid saturation in the data capacity and/or rates. These techniques are commonly referred to as "spatial multiplexing" or multiple-input, multiple-output (MIMO) antenna processing.

In order to achieve these performance gains, MIMO generally provides that both the transmitter and receiver have knowledge of the channel from each transmit antenna to each receive antenna. In some exemplary embodiments, this can be done by the receiver measuring the amplitude and phase of a known transmitted data symbol (e.g., a pilot symbol and/or reference symbol) and sending these measurements to the transmitter as "channel state information" (CSI). CSI can include, for example, amplitude and/or phase of the channel at one or more frequencies, amplitude and/or phase of time-domain multipath components of the signal via the channel, direction of arrival of multipath components of the signal via the channel, and other direct channel measurements known by persons of ordinary skill. Alternately, or in addition, CSI can include a set of transmission parameters recommended for the channel based on one or more channel measurements.

As used herein, "multipath component" can describe any resolvable signal component arriving at a receiver or incident on an antenna array at the receiver. The multipath component can be processed by the receiver at the radio frequency (RF), after conversion to an intermediate frequency (IF), or after conversion to baseband (i.e., zero or near-zero frequency). A plurality of the multipath components can comprise a main component of a transmitted signal received via a primary, direct, or near-direct path from the transmitter to the receiver, as well as one or more secondary components of the transmitted signal received via one or more secondary paths involving reflection, diffraction, scattering, delay, attenuation, and/or phase shift of the transmitted signal. Persons of ordinary skill can recognize that the number and characteristics of the multipath components available to be processed by a receiver can depend on various factors including, e.g., transmit and receive antennas, channel and/or propagation characteristics, transmission frequencies, signal bandwidths, etc.

In the case of a transmit array comprising $N_T$ antennas and a receive array comprising $N_R$ antennas, the receiver can be used to send CSI for $N_T \cdot N_R$ channels to the transmitter. Moreover, in mobile communication environments, these $N_T \cdot N_R$ channels are likely not stationary but vary according to the relative motion between the transmitter and the receiver (e.g., base station and terminal). The rate of change of the channel—and thus the preferable CSI update rate—can be proportional to the relative velocity between the transmitter and the receiver, and the carrier frequency of the signal being transmitted. Further mobile communication systems—including 5G systems—can utilize mmW frequencies in the 5-300 GHz spectrum, which are substantially higher than the 1-5 GHz spectrum used by today's systems. In addition, increasing the numbers antennas (i.e., $N_T$ and/or $N_R$) is expected to be an important technique for achieving performance goals for 5G systems including high data rates. In fact, as such mmW systems evolve, both the base stations and terminals could potentially utilize a multitude of antenna elements each, with the actual number of elements limited only by the physical area and/or volume available in each particular application.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands, including the 700-MHz band in the United States. LTE is accompanied by improvements to non-radio aspects commonly referred to as System Architecture Evolution (SAE), which includes Evolved Packet Core (EPC) network. LTE continues to evolve through subsequent releases.

A feature added in LTE Rel-10 (Rel-10) is support for bandwidths larger than 20 MHz, while remaining backward compatible with Rel-8. As such, a wideband (e.g., >20 MHz) LTE Rel-10 carrier should appear as a number of component carriers (CCs) to an LTE Rel-8 terminal. For an efficient use of a wideband Rel-10 carrier, legacy (e.g., Rel-8) terminals can be scheduled in all parts of the wideband LTE Rel-10 carrier. One way to achieve this is by means of Carrier Aggregation (CA), whereby an LTE Rel-10 UE can receive multiple CCs, each preferably having the same structure as a Rel-8 carrier.

Each of the CCs allocated to a UE also corresponds to a cell. In particular, the UE is assigned a primary serving cell (PCell) as the "main" cell serving the UE. Both data and control signaling can be transmitted over the PCell, which is always activated. In addition, the UE can be assigned one or more supplementary or secondary serving cells (SCells) that are typically used for transmitting data only. For example, the Scell(s) can provide extra bandwidth to enable greater data throughput, and can be activated or deactivated dynamically.

While LTE was primarily designed for user-to-user communications, 5G cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band) and URLLC (Ultra-Reliable Low Latency Communication). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher.

The large variety of requirements for the next generation of mobile communications system (5G or NR) implies that frequency bands at many different carrier frequencies will be needed. For example, low bands will be needed to achieve sufficient coverage and higher bands (e.g. mmW, i.e. near and above 30 GHz) will be needed to reach the required capacity. At mmW frequencies the propagation properties are more challenging and high gain beamforming at the base station is required to achieve sufficient link budget.

At mmW frequencies, concepts for handling mobility between beams (both within and between TRPs) have been specified in NR. At these frequencies, where high-gain beamforming can be used, each beam is only optimal within a small area, and the link budget outside the optimal beam deteriorates quickly. Hence, frequent and fast beam switching can be necessary to maintain high performance. To support such beam switching, a beam indication framework has been specified in NR. For example, for downlink data transmission (PDSCH), the downlink control information (DCI) contains a transmission configuration indicator (TCI) that informs the UE which transmit beam is used so that it can adjust its receive beam accordingly. This is beneficial for the case of analog Rx beamforming where the UE needs to determine an apply the Rx beamforming weights before it can receive the PDSCH.

As used herein, the terms "spatial filtering weights" and "spatial filtering configuration" can refer to antenna weights that are applied at either the transmitter (gNB or UE) or the receiver (UE or gNB) for transmission/reception of data and/or control information. These terms are general in the sense that different propagation environments can lead to different spatial filtering weights that match the transmission/reception of a signal to the channel. The spatial filtering weights may not always result in a beam in a strict sense.

Prior to data transmission, a training phase is required in order to determine the gNB and UE spatial filtering configurations, referred to as DL beam management in NR terminology. This is illustrated in FIG. 1, which shows an exemplary beam training phase follows by a data transmission phase utilizing the results of the training phase. In NR, two types of reference signals (RSs) are used for DL beam management operations: channel state information RS (CSI-RS) and synchronization signal/physical broadcast control channel (SS/PBCH) block, or SSB for short. FIG. 1 shows an example where CSI-RS is used to find an appropriate beam pair link (BPL), meaning a suitable gNB transmit spatial filtering configuration (gNB Tx beam) plus a suitable UE receive spatial filtering configuration (UE Rx beam) resulting in sufficiently large link budget.

As shown in FIG. 1, in the exemplary gNB Tx beam sweep, the gNB configures the UE to measure on a set of five (5) CSI-RS resources (RS1 . . . RS5) that are transmitted with five (5) different spatial filtering configurations (e.g., Tx beams). The UE can also be configured to report back the RS ID and the reference-signal receive power (RSRP) of the CSI-RS corresponding to the maximum measured RSRP. In the example shown in FIG. 1, the maximum measured RSRP corresponds to RS4. In this way, the gNB can learn the preferred Tx beam from the UE perspective.

In the subsequent UE Rx beam sweep, the gNB can transmit a number of CSI-RS resources in different OFDM symbols, all with the same spatial filtering configuration (e.g., Tx beam) that was used to transmit RS4 previously. The UE then tests a different Rx spatial filtering configuration (Rx beam) in each OFDM symbol to identify the largest received RSRP. The UE remembers the RS ID (RS ID 6 in this example) and the corresponding spatial filtering configuration that resulted in the largest RSRP. The network can then refer to this RS ID in the future when DL data is scheduled to the UE, thus allowing the UE to adjust its Rx spatial filtering configuration (e.g., Rx beam) to receive the PDSCH. As mentioned above, the RS ID is contained in a transmission configuration indicator (TCI) that is carried in a field in the DCI that schedules the PDSCH.

In 3GPP NR standards, the term "spatial quasi-location" (QCL for short) is used to refer to a relationship between the antenna port(s) of two different DL reference signals (RSs) that are transmitted by the gNB. If two transmitted DL RSs are spatially QCL'd at the UE receiver, then the UE may assume that the first and second RSs are transmitted with approximately the same Tx spatial filter configuration. Based on this assumption, the UE can use approximately the same Rx spatial filter configuration to receive the second reference signal as it used to receive the first reference signal. In this way, spatial QCL is a term that assists in the use of analog beamforming and formalizes the notion of "same UE Rx beam" over different time instances.

Referring to the downlink data transmission phase illustrated in FIG. 1, the gNB indicates to the UE that the PDSCH DMRS is spatially QCL'd with RS6. This means that the UE may use the same Rx spatial filtering configuration (Rx beam) to receive the PDSCH as the preferred spatial filtering configuration (Rx beam) determined based on RS6 during the UE beam sweep in the DL beam management phase.

While spatial QCL refers to a relationship between two different DL RSs from a UE perspective, the term "spatial relation" is used, within 3GPP NR standardization, to refer to a relationship between an UL RS (PUCCH/PUSCH DMRS) and another RS, which can be either a DL RS (CSI-RS or SSB) or an UL RS (SRS). Like QCL, this term is also defined from a UE perspective. If the UL RS is spatially related to a DL RS, it means that the UE should transmit the UL RS in the opposite (reciprocal) direction from which it received the second RS previously. More precisely, the UE should apply substantially the same Tx spatial filtering configuration for the transmission of the first RS as the Rx spatial filtering configuration it used to receive the second RS previously. If the second RS is an uplink RS, then the UE should apply the same Tx spatial filtering configuration for the transmission of the first RS as the Tx spatial filtering configuration it used to transmit the second RS previously.

Referring to the uplink data transmission phase illustrated in FIG. 1, the gNB indicates to the UE that the Physical Uplink Control Channel (PUCCH) DMRS is spatially related to RS6. This means that the UE should use substantially the same Tx spatial filtering configuration (Tx beam) to transmit the PUCCH as the preferred Rx spatial filtering configuration (Rx beam) determined based on RS6 during the UE beam sweep in the DL beam management phase.

Although UL and DL RS are useful and/or necessary for beam management, they are also overhead, in that they occupy a transmission resource that could otherwise be used for carrying user data and/or control signaling. As such, it is generally desirable to minimize the number of RS transmitted by the UE or the gNB. This overhead becomes even more problematic when multiple CCs (and/or multiple bandwidth parts (BWPs) on a single CC) are used in the UL and/or DL between UE and gNB.

As briefly mentioned above, in carrier aggregation (CA), a UE is assigned multiple serving cells, each corresponding to a CC. The coverage of the serving cells may differ, for example, if the corresponding CCs are on different frequency bands that experience different propagation conditions (e.g., pathloss, scattering, etc.). In this manner, the serving cells associated with the respective CCs can have different coverage areas or "cell sizes." In the specific case of inter-band CA, the CCs will experience different pathloss, with the difference increasing with the frequency difference between the CCs. Put a different way, the inter-band difference in path loss can result in different coverage areas for the PCell and the SCell(s).

To reduce RS overhead, it can be desirable to perform beam management measurements to identify a preferred RS on one frequency carrier, but then indicate to the UE that the identified RS should be used as a spatial relation for the transmission of SRS on a different carrier. This can be referred to as "cross-carrier spatial relation indication." Likewise, a similar approach can be desirable across different bandwidth parts (BWPs) of one or more component carriers (CC), which can be referred to as "cross-CC/BWP spatial relation indication." However, this is not currently possible using existing techniques for configuring RS measurements in a UE.

SUMMARY

Embodiments of the present disclosure provide specific improvements to communication between user equipment (UE) and network nodes (e.g., gNBs) in a wireless communication network, such as by facilitating solutions to overcome the exemplary problems described above. More specifically, exemplary embodiments can provide an efficient technique for a network node to signal and/or indicate, to the UE, cross-CC and/or cross-BWP spatial relations using either message bits (e.g., bits of a SP SRS Activation/Deactivation MAC CE message) that exist but are currently reserved, or by extension of a currently-existing message such that the ID of the target CC/BWP can be indicated for one or more spatial relation Resource IDs in the existing message.

Exemplary embodiments of the present disclosure include methods and/or procedures for activating or deactivating reference signal (RS) resources usable for management of transmit and/or receive beams for communication with a user equipment (UE) in a wireless communication network. The exemplary methods and/or procedures can be implemented and/or performed by a network node (e.g., base station, gNB, eNB, en-gNB, ng-eNB, etc. or component thereof) in communication with a user equipment (UE, e.g., wireless device or component thereof, such as a modem) in a wireless communication network.

The exemplary methods and/or procedures can include sending, to the UE, one or more control messages comprising configuration of a plurality of RS resources associated with a particular bandwidth part (BWP) of a particular component carrier (CC) in the wireless communication network. For example, the one or more control messages can be RRC messages, and the plurality of RS resources can be semi-persistent Sounding Reference Signal (SP-SRS) resources.

In some embodiments, the exemplary methods and/or procedures can include determining one or more spatial relations at least one RS resource of the plurality of RS resources, and further resources that are not associated with the particular BWP of the particular CC. For example, spatial relations can be determined between each respective RS resource and resources associated with a different CC, resources associated with a different BWP of the particular CC, or resources associated with a different BWP of a different CC.

The exemplary methods and/or procedures can also include sending, to the UE, a further control message comprising identification of at least one RS resource, of the plurality of RS resources, to be activated or deactivated. The further control message can also include, for each particular RS resource of the identified RS resources, an indication of the particular RS resource's spatial relation with a further resource that is not associated with the particular BWP of the particular CC. In some embodiments, the further control message can be a SP SRS Activation/Deactivation MAC CE message. In some embodiments, for each indicated spatial relation, the further resource can be associated with one or more of the following: a further CC that is different from the particular CC; and a further BWP that is different from the particular BWP.

In some embodiments, each indication of a spatial relation can include one or more of the following: an identity of a CC associated with the further resource; and an identity of a BWP associated with the further resource. In some embodiments, the plurality of RS resources can be configured as a plurality of sets of RS resources, and the identification of at least one RS resource comprises an identification of one set of the plurality of sets. In some embodiments, the plurality of spatial relations can be further associated with Physical Uplink Control Channel (PUCCH) resources.

In some embodiments, the exemplary methods and/or procedures can also include performing a procedure, using the identified RS resources, for management of transmit and/or receive beams for communication with the UE.

Other exemplary embodiments of the present disclosure include methods and/or procedures for activating or deactivating reference signal (RS) resources usable for management of transmit and/or receive beams for communication with a network node in a wireless communication network. These exemplary methods and/or procedures can be performed and/or implemented by a user equipment (UE, e.g., wireless device or component thereof, such as a modem) in communication with a network node (e.g., base station, eNB, gNB, etc., or component thereof) in a wireless communication network.

The exemplary methods and/or procedures can include receiving, from the network node, one or more control messages comprising configuration of a plurality of RS resources associated with a particular bandwidth part (BWP) of a particular component carrier (CC) in the wireless communication network. For example, the one or more control messages can be RRC messages, and the plurality of RS resources can be semi-persistent Sounding Reference Signal (SP-SRS) resources.

The exemplary methods and/or procedures can also include receiving, from the network node, a further control message comprising identification of at least one RS resource, of the plurality of RS resources, to be activated or deactivated. The further control message can also include, for each particular RS resource of the identified RS resources, an indication of the particular RS resource's spatial relation with a further resource that is not associated with the particular BWP of the particular CC. In some embodiments, the further control message can be a SP SRS Activation/Deactivation MAC CE message. In some embodiments, for each indicated spatial relation, the further resource can be associated with one or more of the following: a further CC that is different from the particular CC; and a further BWP that is different from the particular BWP.

In some embodiments, each indication of a spatial relation can include one or more of the following: an identity of a CC associated with the further resource; and an identity of a BWP associated with the further resource. In some embodiments, the plurality of RS resources can be configured as a plurality of sets of RS resources, and the identification of at least one RS resource comprises an identification of one set of the plurality of sets. In some embodiments, the plurality of spatial relations can be further associated with Physical Uplink Control Channel (PUCCH) resources.

In some embodiments, the exemplary methods and/or procedures can also include performing a procedure, using the identified RS resources, for management of transmit and/or receive beams for communication with the network node.

Other exemplary embodiments include network nodes (e.g., base station, gNB, eNB, en-gNB, ng-eNB, etc. or component thereof) or user equipment (UE, e.g., wireless device or component thereof, such as a modem) that are arranged and/or configured to perform operations corresponding to any of the exemplary methods and/or procedures described herein.

Other exemplary embodiments include non-transitory, computer-readable media storing program instructions that, when executed by at least one processor, configure such network nodes or such UEs to perform operations corresponding to any of the exemplary methods and/or procedures described herein. Other exemplary embodiments include computer program products comprising such program instructions.

These and other objects, features and advantages of the exemplary embodiments of the present disclosure will become apparent upon reading the following detailed description of the exemplary embodiments of the present disclosure.

BRIEF DESCRIPTION OF THE DRAWINGS

FIG. 2 illustrates the format of a SP SRS Activation/Deactivation MAC CE message as currently defined by 3GPP TS 38.321.

FIGS. 3-10 illustrate various exemplary alternative format for the SP SRS Activation/Deactivation MAC CE message, according to various exemplary embodiments of the present disclosure.

DETAILED DESCRIPTION

Figure 1:
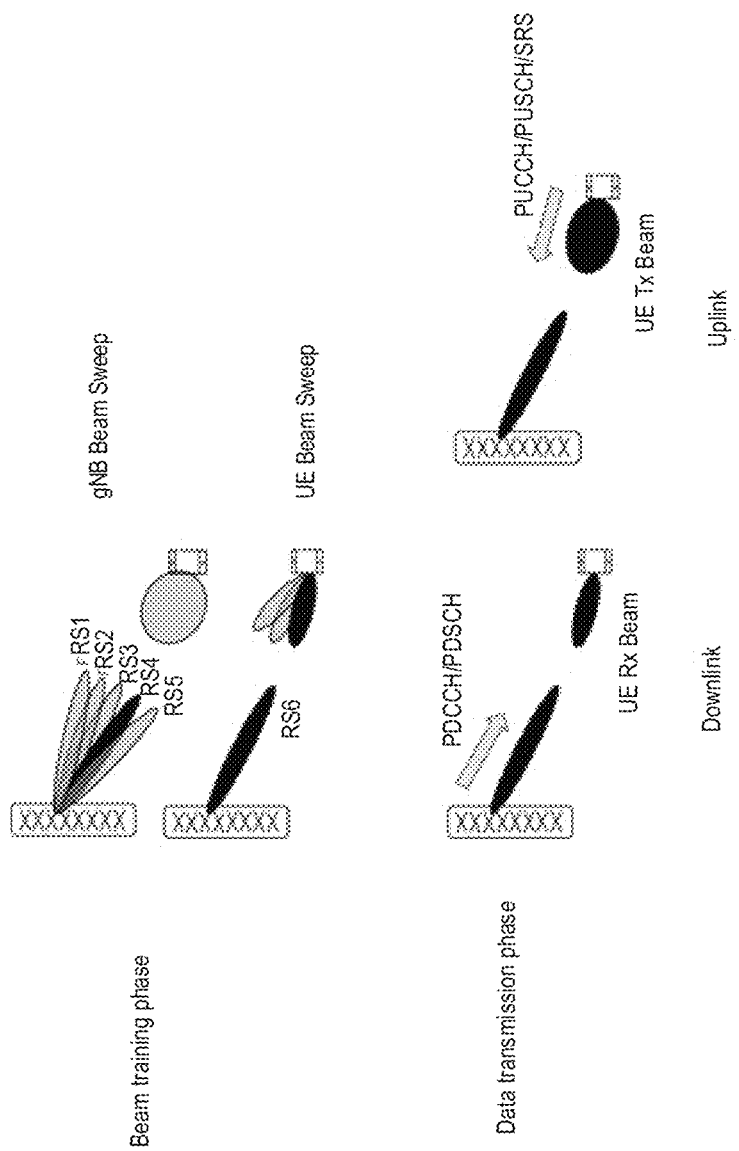
FIG. 1 illustrates an exemplary combination of a beam training phase, between a gNB and a user equipment (UE), followed by a data transmission phase utilizing the results of the training phase, according to various exemplary embodiments.

As briefly mentioned above, although it is desirable to utilize cross-CC/BWP spatial relations when performing and/or configuration UE reference signal (RS) measurements, this is not currently possible using existing techniques. This situation is discussed in more detail below, followed by a discussion of exemplary embodiments of the present disclosure and how they address these issues and/or limitations of existing techniques.

3GPP Technical Specifications (TS) 38.213 and 38.331 specify that, for NR, a UE can be configured via Radio Resource Control (RRC) protocol with a list of up to eight (8) spatial relations for PUCCH. This list is given by the RRC parameter PUCCH_SpatialRelationInfo. For example, the list would typically contain the IDs of multiple SSBs and/or CSI-RS resources used for DL beam management. Alternatively, if SRS-based UL beam management is employed in the network, then the list may also contain the IDs of multiple SRS resources.

Based on the DL (UL) beam management measurements performed by the UE (gNB), the gNB selects one of the RS IDs from the list of configured ones in PUCCH_SpatialRelationInfo. The selected spatial relation can be indicated via a MAC-CE message signaled to the UE for a given PUCCH resource. The UE can then use the signaled spatial relation for the purposes of adjusting the Tx spatial filtering configuration for the transmission on that PUCCH resource.

3GPP TS 38.321 and 38.331 also specify that a UE can be configured via Radio Resource Control (RRC) protocol with a set of semi-persistent (SP) Sounding Reference Signal (SRS) resources (also referred to as SP-SRS resources). The set may contain from one to 16 SP-SRS resources. This can be performed, e.g., using the SRS-Config information element (IE) of the RRC protocol, as specified in 3GPP TS 38.331. The configured SP-SRS resource sets are initially deactivated upon configuration and after a handover. Subsequently, the network can activate and deactivate the configured SP SRS resource sets for a Serving Cell by sending the SP SRS Activation/Deactivation MAC CE message described in subclause 6.1.3.17 of 3GPP TS 38.321, version 15.1.0.

FIG. 2 shows an exemplary SP SRS Activation/Deactivation MAC CE message as currently specified in 3GPP TS 38.321. In addition to the fields shown in FIG. 2, the SP SRS Activation/Deactivation MAC CE message is identified by a MAC PDU subheader with a six-bit LCID field equal to "110010", as specified in Table 6.2.1-1 of TS 38.321. The message has a variable N-octet size and the fields shown are defined as follows:

A/D: This field indicates whether the MAC CE is used to activate or deactivate indicated SP SRS resource set. The field is set to "1" to indicate activation, otherwise it indicates deactivation.

Serving Cell ID: This field indicates the identity of the Serving Cell for which the MAC CE applies. The length of the field is 5 bits.

BWP ID:This field contains BWP-Id, as specified in TS 38.331, of an uplink bandwidth part (e.g., a bandwidth range of a particular carrier) for which the MAC CE applies. The length of the BWP ID field is 2 bits.

SUL: This field indicates whether the MAC CE applies to the normal uplink (NUL) carrier or the supplementary uplink (SUL) carrier configuration. A value of "1" indicates that it applies to the SUL carrier configuration, while "0" indicates that it applies to the NUL carrier configuration.

SP SRS Resource Set ID: This field indicates the SP SRS Resource Set ID identified by SRS-ResourceSetId as specified in TS 38.331, which is to be activated or deactivated. The length of the field is 4 bits.

$F_i$: This field indicates the type of a resource used as a spatial relationship for SRS resource within SP SRS Resource Set indicated with SP SRS Resource Set ID field. $F_0$ refers to the first SRS resource within the resource set, $F_i$ to the second, and so on. The field is set to "1" to indicate NZP CSI-RS resource index is used, it is set to "0" to indicate either SSB index or SRS resource index is used. The length of the field is one bit, and the field is only present if MAC CE is used for activation, i.e., A/D field is set to "1".

Resource $ID_i$: This field contains an identifier of the resource used for spatial relationship derivation for SRS resource i. Resource $ID_0$ refers to the first SRS resource within the resource set, Resource $ID_1$ to the second, and so on. If $F_i$ is set to "0" and the first bit of this field is set to "1", then the remainder of this field contains SSB-Index as specified in TS 38.331; if $F_i$ is set to "0" and the first bit of this field is set to "0", then the remainder this field contains SRS-ResourceId as specified in TS 38.331. The length of the field is 7 bits, and it is only present if MAC CE is used for activation, i.e., A/D field is set to "1".

R: Reserved bit, set to "0".

Octets 3-N of the exemplary SP SRS Activation/Deactivation MAC CE message shown in FIG. 2 include the IDs of reference signal (RS) resources, which map directly to the elements of the previously configured set of SP-SRS resources. Each Resource ID refers to either a downlink RS or an uplink RS. Each referenced DL RS can be a SS/PBCH block or a configured CSI-RS resource, and each referenced UL RS can be a separately (e.g., not in the set) configured SRS. Each received Resource ID is used by the UE for "spatial relationship derivation" for the corresponding SRS in the set. In other words, the UE should transmit the SRS using the same spatial domain transmit filter it used to receive or transmit the DL/UL RS that is indicated by MAC-CE as a spatial relation. In general, this means the UE should beamform the SRS transmission in the same direction as it received or transmitted the indicated RS.

During beam management, measurements are performed on sets of DL or UL reference signals transmitted on one or more different carrier frequencies. The purpose of such measurements is to identify a "preferred" RS corresponding to a particular transmit/receive spatial domain filter (i.e., beam). The preferred RS then indicated in the MAC-CE message so that the UE can use it as a spatial relation for the transmission of SRS.

Although UL and DL reference signals (RS) are useful and/or necessary for beam management, they are also overhead, in that they occupy a transmission resource that could otherwise be used for carrying user data and/or control signaling. As such, it is generally desirable to minimize the number of RS transmitted by the UE or the gNB. This overhead becomes even more problematic when multiple CCs (and/or multiple BWPs on a single CC) are used for CA in the UL and/or DL between UE and gNB. As described above, each CC also corresponds to a serving cell for the UE. In particular, one CC will correspond to the UE's primary serving cell (PCell) and one or more other CCs will correspond to the UE's respective supplementary or secondary serving cells (SCells).

To reduce RS overhead, it can be desirable to perform beam management measurements to identify a preferred RS on one frequency carrier, but then indicate to the UE that the identified RS should be used as a spatial relation for the transmission of SRS on a different carrier. This can be referred to as "cross-carrier spatial relation indication." Likewise, a similar approach can be desirable across different bandwidth parts (BWPs) of one or more CCs, which can be referred to as "cross-CC/BWP spatial relation indication." Given the correspondence between CCs and serving cells, this can also be understood as a "cross-cell/BWP spatial relation indication." However, it is not possible to provide such indications using the structure of the existing SP SRS Activation/Deactivation MAC CE message shown in FIG. 2. In other words, the Resource IDs in octets 3-N are local to a particular CC/BWP combination.

Exemplary embodiments of the present disclosure address these problems, issues, and/or drawbacks of existing solutions by providing a flexible but efficient approach for indicating spatial relations (e.g., for SRS resources) using MAC-CE when a common spatial relation indicator is shared by multiple resources. Exemplary embodiments accomplish this in various particular ways. In some embodiments, a UE can be configured to ignore a resource ID field in MAC-CE, such that a provided spatial relation indicator is applied to all resources. Alternatively, a resource ID field can be removed from the MAC-CE message. In some embodiments, a particular combination of bits in the resource ID field can indicate that a provided spatial relation indicator should apply commonly to all resources, while other combination(s) of bits in the resource ID field can indicate per-resource application of the spatial relation indicator.

As briefly mentioned above, exemplary embodiments can provide an efficient technique for a network node to signal and/or indicate, to the UE, cross-CC/BWP spatial relations using either message bits (e.g., bits of a SP SRS Activation/Deactivation MAC CE message) that exist but are currently reserved, or by extension of a currently-existing message such that the ID of the target CC/BWP can be indicated for one or more spatial relation Resource IDs in the existing message.

When used in NR UEs and network nodes supporting spatial relation functionality, these exemplary embodiments can provide various improvements, benefits, and/or advantages. For example, by indicating that a RS ID identified on one CC/BWP has a spatial relation to RS (e.g., SP-SRS) transmission on another CC/BWP, beam management procedures would no longer be required on every CC/BWP used for communication by the UE, thus saving RS (e.g., SP-SRS) overhead on one or more CC/BWP. By eliminating the requirement to perform beam management on all CC/BWP, such techniques can also reduce energy consumed by UEs and/or network nodes in transmitting and/or receiving RS.

FIGS. 3-10, described below, illustrate various exemplary alternative formats for the SP SRS Activation/Deactivation MAC CE message, according to various exemplary embodiments of the present disclosure.

FIG. 3 shows a format for one alternative embodiment of the SP SRS Activation/Deactivation MAC CE message. In the embodiment shown in FIG. 3, one additional field is added to the current format, shown in FIG. 2, for each Resource ID. For each particular Resource ID 0 . . . N–3 identified in the message, this additional field indicates a cross-CC and/or cross-BWP spatial relation based on the identification of a particular CC and/or particular BWP corresponding to, or associated with, that particular Resource ID. Although four bits are used to identify the target CC/BWP for each Resource ID, this size is merely exemplary and other numbers of bits can be used as necessary and/or convenient.

FIG. 4 shows a format for another alternative embodiment of the SP SRS Activation/Deactivation MAC CE message. In the embodiment shown in FIG. 4, only one additional field is added to the current format shown in FIG. 2. This additional field indicates and/or identifies a common cross-carrier and/or cross-BWP spatial relation based on the identification of a particular CC and/or particular BWP corresponding to, or associated with, all Resource IDs 0 . . . N–3 identified in the message.

FIG. 5 shows a format for another alternative embodiment of the SP SRS Activation/Deactivation MAC CE message. Similar to the embodiment shown in FIG. 4, the embodiment shown in FIG. 5 includes a field indicating and/or identifying a cross-carrier and/or cross-BWP spatial relation associated with all Resource IDs 0 . . . N–3 identified in the message. The embodiment shown in FIG. 5 also includes a bitmap field (comprising one or more octets), where each bit corresponds to a particular one of the Resource IDs 0 . . . N–3. The two values of each bit indicate, respectively, that the corresponding Resource ID is or is not associated with the indicated cross-carrier and/or cross-BWP spatial relation.

FIG. 6 shows a format for another alternative embodiment of the SP SRS Activation/Deactivation MAC CE message. In the embodiment shown in FIG. 6, two of the bits marked as "Reserved" in the conventional format shown in FIG. 2 are used to indicate and/or identify a particular cross-carrier and/or cross-BWP spatial relation that is associated with all Resource IDs 0 . . . N–3 identified in the message. The use of two "Reserved" bits facilitates the indication and/or identification of four different cross-carrier and/or cross-BWP spatial relations. This is merely exemplary, however, and the skilled person will readily comprehend that one or three "Reserved" bits can be used to indicate two or up to eight cross-CC and/or cross-BWP spatial relations, respectively.

In some exemplary embodiments, a new RRC message and/or IE can be defined (e.g., as part of 3GPP TS 38.331) for the network node to configure a UE with a plurality (e.g., a list) of CC-BWP combinations usable for spatial relations. These combinations can be unique, such that each CC-BWP combination can include at least one of a different BWP and a different CC than all other CC-BWP combinations configured via the new RRC message. For example, a list of up to eight (8) CC-BWP combinations can be configured by the new RRC message. FIG. 7 shows a format for an alternative embodiment of the SP SRS Activation/Deactivation MAC CE message based on such a configuration. In the embodiment shown in FIG. 7, the three "Reserved" bits are used to convey an index to one of the CC-BWP combinations previously configured. In some embodiments, the configured list can comprise seven (7) CC-BWP combinations, with one index value reserved to indicate that the target CC/BWP is identified by the Serving Cell ID/BWP ID fields in the existing MAC-CE message structure.

In other exemplary embodiments, the cross-carrier and/or cross-BWP spatial relation(s) can be indicated by reference to information provided for different purposes in other MAC and/or RRC messages from the network to the UE. For example, RRC messages can be used to configure the UE with a list of Transmission Configuration Indicator (TCI) states for dynamically indicating (over downlink control information, DCI) a transmission configuration that includes QCL relationships between the DL RSs in one RS set and the PDSCH or PDCCH demodulation RS ports Each TCI state identifier is associated with a particular CC-BWP combination and a particular downlink (DL) RS.

FIG. 8 shows a format for another alternative embodiment of the SP SRS Activation/Deactivation MAC CE message. In the embodiment shown in FIG. 8, one "Reserved" bit is used to indicate whether octets 3 . . . N contain Resource IDs 0 . . . N–3, as in the existing SP SRS Activation/Deactivation MAC CE message shown in FIG. 2, or TCI State IDs. If octets 3 . . . N contain TCI State IDs, the UE can determine the corresponding cross-carrier and/or cross-BWP spatial relations with reference to the TCI state configurations previously received.

As another example, the network can configure a UE (via RRC) with a list of up to eight (8) spatial relations for PUCCH. This list can be configured, e.g., using the RRC PUCCH_SpatialRelationInfo IE. For example, the list would typically contain IDs of a number of SSBs and/or CSI-RS resources used for the purposes of DL beam management. FIG. 9 shows a format for another alternative embodiment of the SP SRS Activation/Deactivation MAC CE message. In the embodiment shown in FIG. 9, one "Reserved" bit is used to indicate whether octets 3 . . . N contain Resource IDs 0 . . . N–3, as in the existing SP SRS Activation/Deactivation MAC CE message shown in FIG. 2, or indices to the list of previously configured PUCCH Spatial Relations. If octets 3 . . . N contain PUCCH Spatial Relation Indices, the UE can determine the corresponding cross-carrier and/or cross-BWP spatial relations by referring to PUCCH_SpatialRelationInfo previously received.

As another example, the network can configure a UE (via RRC) with spatial relations between a reference RS and one or more target sounding reference signals (SRS). These can be configured, e.g., using the RRC SRS-SpatialRelationInfo IE. Although currently configured individually, a plurality of SRS-SpatialRelationInfo can be provided as a list, similar to the PUCCH_SpatialRelationInfo IE described above. FIG. 10 shows a format for another alternative embodiment of the SP SRS Activation/Deactivation MAC CE message. In the embodiment shown in FIG. 10, one "Reserved" bit is used to indicate whether octets 3 . . . N contain Resource IDs 0 . . . N–3, as in the existing SP SRS Activation/Deactivation MAC CE message shown in FIG. 2, or indices to the previously configured list of SRS Spatial Relations. If octets 3 . . . N contain SRS Spatial Relation Indices, the UE can determine the corresponding cross-carrier and/or cross-BWP spatial relations by referring to SRS-SpatialRelationInfo previously received (or a corresponding IE comprising a list of such information).

Figure 11:
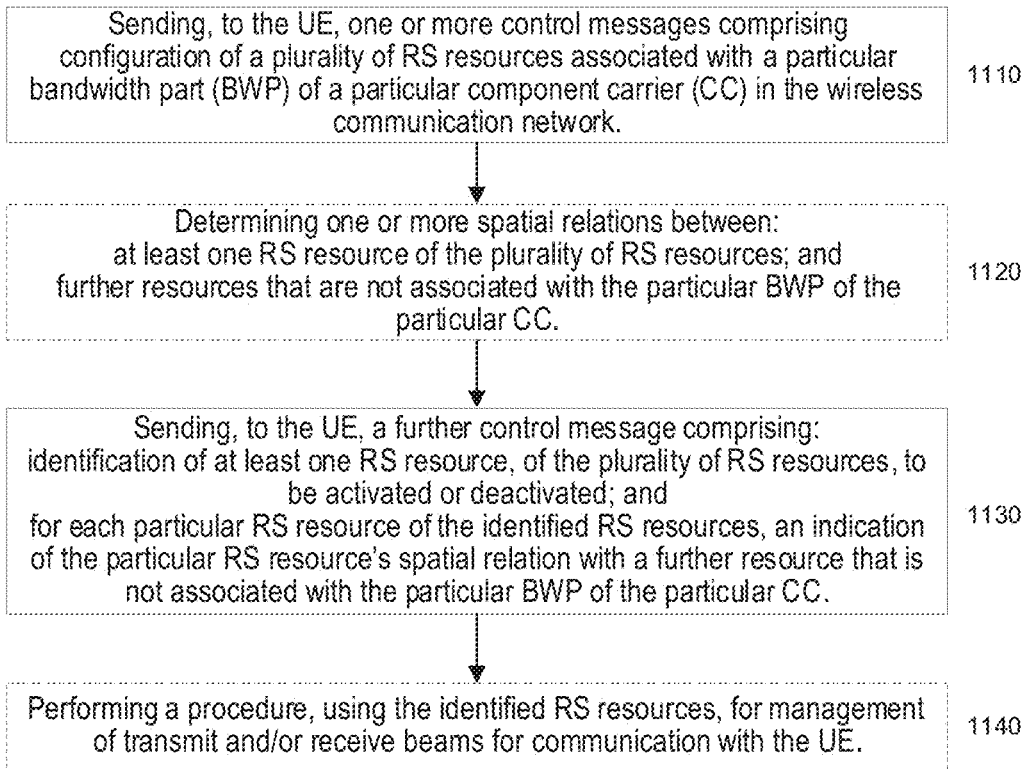
FIG. 11 illustrates a flow diagram of an exemplary method and/or procedure performed by a network node (e.g., base station, gNB, eNB, en-gNB, ng-eNB, etc. or component thereof), according to various exemplary embodiments of the present disclosure.

FIG. 11 shows a flow diagram of an exemplary method and/or procedure for activating or deactivating reference signal (RS) resources usable for management of transmit and/or receive beams for communication with a user equipment (UE) in a wireless communication network, according to various exemplary embodiments of the present disclosure. The exemplary method and/or procedure shown in FIG. 11 can be implemented and/or performed by a network node (e.g., base station, gNB, eNB, en-gNB, ng-eNB, etc. or component thereof) in communication with a user equipment (UE, e.g., wireless device or component thereof, such as a modem) in a wireless communication network. Furthermore, the exemplary method and/or procedure shown in FIG. 11 can be utilized cooperatively with the exemplary method and/or procedures shown in FIG. 12 (described below), to provide various exemplary benefits described herein. Although FIG. 11 shows blocks in a particular order, this order is merely exemplary, and the operations of the exemplary method and/or procedure can be performed in a different order than shown in FIG. 11 and can be combined and/or divided into blocks having different functionality. Optional operations are indicated by dashed lines.

The exemplary method and/or procedure can include the operations of block 1110, where the network node can send, to the UE, one or more control messages comprising configuration of a plurality of RS resources associated with a particular bandwidth part (BWP) of a particular component carrier (CC) in the wireless communication network. For example, the one or more control messages can be RRC messages, and the plurality of RS resources can be semi-persistent Sounding Reference Signal (SP-SRS) resources.

In some embodiments, the exemplary method and/or procedure can include the operations of block 1120, where the network node can determine one or more spatial relations at least one RS resource of the plurality of RS resources, and further resources that are not associated with the particular BWP of the particular CC. For example, the network node can determine spatial relations between each respective RS resource and resources associated with a different CC, resources associated with a different BWP of the particular CC, or resources associated with a different BWP of a different CC.

The exemplary method and/or procedure can also include the operations of block 1130, where the network node can send, to the UE, a further control message comprising identification of at least one RS resource, of the plurality of RS resources, to be activated or deactivated. The further control message can also include, for each particular RS resource of the identified RS resources, an indication of the particular RS resource's spatial relation with a further resource that is not associated with the particular BWP of the particular CC. In some embodiments, the further control message can be a SP SRS Activation/Deactivation MAC CE message. In some embodiments, the indicated spatial relations can be among the spatial relations determined in operation 1120. In other words, for each indicated spatial relation, the further resource can be associated with one or more of the following: a further CC that is different from the particular CC; and a further BWP that is different from the particular BWP.

In some embodiments, each indication of a spatial relation can include one or more of the following: an identity of a CC associated with the further resource; and an identity of a BWP associated with the further resource. In some embodiments, the plurality of RS resources can be configured as a plurality of sets of RS resources, and the identification of at least one RS resource comprises an identification of one set of the plurality of sets. In some embodiments, the plurality of spatial relations are further associated with Physical Uplink Control Channel (PUCCH) resources.

In some embodiments, the further control message can include an identification of the particular BWP and the particular CC, said identification being associated with all identified RS resources. In some embodiments, for each particular RS resource of the identified RS resources, the identification of the particular RS resources comprises a RS resource identifier. In some embodiments, for each particular RS resource of the identified RS resources, the indication of the particular RS resource's spatial relation with a further resource that is not associated with the particular BWP of the particular CC comprises a bit in a bitmap.

In some embodiments, the exemplary method and/or procedure can also include the operations of block 1140, where the network node can perform a procedure, using the identified RS resources, for management of transmit and/or receive beams for communication with the UE.

Figure 12:
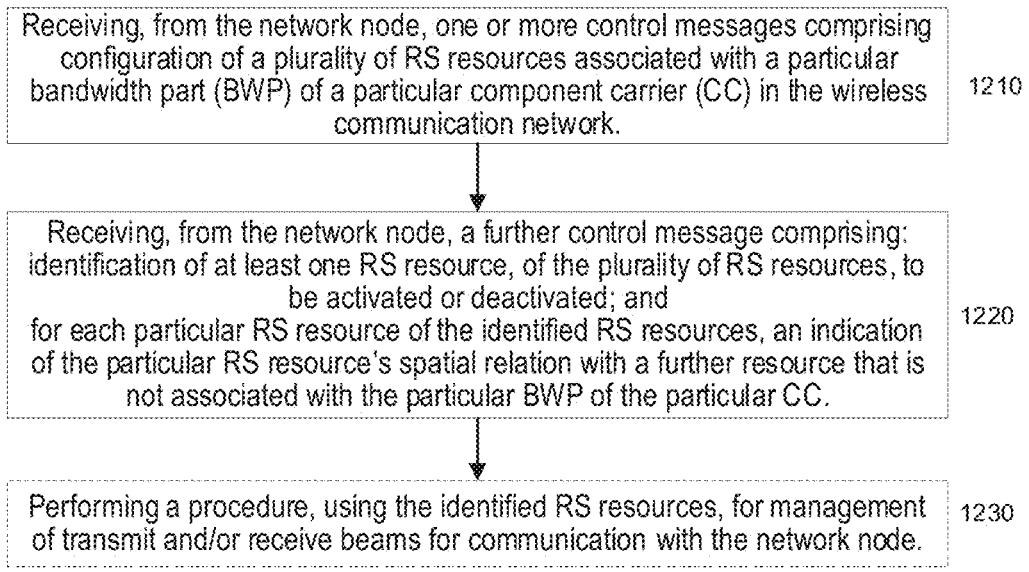
FIG. 12 illustrates a flow diagram of an exemplary method and/or procedure performed by a UE or wireless device, according to various exemplary embodiments of the present disclosure.

FIG. 12 shows a flow diagram of an exemplary method and/or procedure for activating or deactivating reference signal (RS) resources usable for management of transmit and/or receive beams for communication with a network node in a wireless communication network, according to various exemplary embodiments of the present disclosure. The exemplary method and/or procedure shown in FIG. 12 can be performed and/or implemented by a user equipment (UE, e.g., wireless device or component thereof, such as a modem) in communication with a network node (e.g., base station, gNB, eNB, en-gNB, ng-eNB, etc. or component thereof) in a wireless communication network. Furthermore, the exemplary method and/or procedure shown in FIG. 12 can be utilized cooperatively with the exemplary method and/or procedure shown in FIG. 11 (described above), to provide various exemplary benefits described herein. Although FIG. 12 shows blocks in a particular order, this order is merely exemplary, and the operations of the exemplary method and/or procedure can be performed in a different order than shown in FIG. 12 and can be combined and/or divided into blocks having different functionality. Optional operations are indicated by dashed lines.

The exemplary method and/or procedure can include the operations of block 1210, where the UE can receive, from the network node, one or more control messages comprising configuration of a plurality of RS resources associated with a particular bandwidth part (BWP) of a particular component carrier (CC) in the wireless communication network. For example, the one or more control messages can be RRC messages, and the plurality of RS resources can be semi-persistent Sounding Reference Signal (SP-SRS) resources.

The exemplary method and/or procedure can also include the operations of block 1220, where the UE can receive, from the network node, a further control message comprising identification of at least one RS resource, of the plurality of RS resources, to be activated or deactivated. The further control message can also include, for each particular RS resource of the identified RS resources, an indication of the particular RS resource's spatial relation with a further resource that is not associated with the particular BWP of the particular CC. In some embodiments, the further control message can be a SP SRS Activation/Deactivation MAC CE message. In some embodiments, for each indicated spatial relation, the further resource can be associated with one or more of the following: a further CC that is different from the particular CC; and a further BWP that is different from the particular BWP.

In some embodiments, each indication of a spatial relation can include one or more of the following: an identity of a CC associated with the further resource; and an identity of a BWP associated with the further resource. In some embodiments, the plurality of RS resources can be configured as a plurality of sets of RS resources, and the identification of at least one RS resource comprises an identification of one set of the plurality of sets. In some embodiments, the plurality of spatial relations can be further associated with Physical Uplink Control Channel (PUCCH) resources.

In some embodiments, the further control message can include an identification of the particular BWP and the particular CC, said identification being associated with all identified RS resources. In some embodiments, for each particular RS resource of the identified RS resources, the identification of the particular RS resources comprises a RS resource identifier. In some embodiments, for each particular RS resource of the identified RS resources, the indication of the particular RS resource's spatial relation with a further resource that is not associated with the particular BWP of the particular CC comprises a bit in a bitmap.

In some embodiments, the exemplary method and/or procedure can also include the operations of block 1230, where the UE can perform a procedure, using the identified RS resources, for management of transmit and/or receive beams for communication with the network node.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 13:
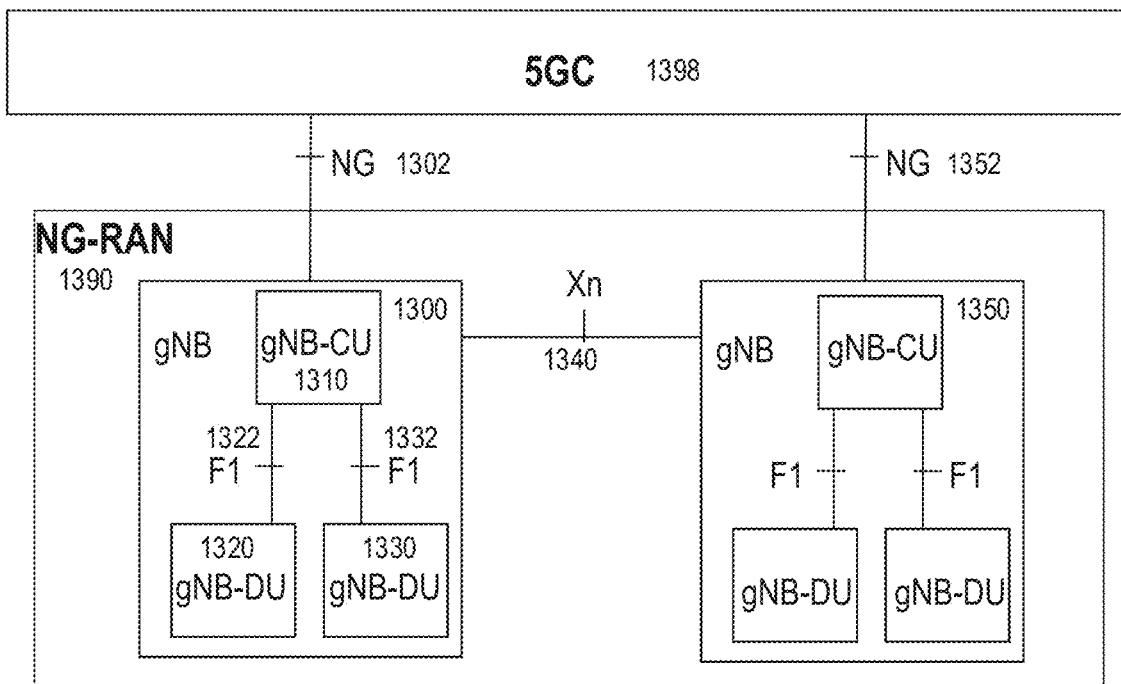
FIGS. 13-14 illustrate two high-level views of an exemplary 5G network architecture.

FIG. 13 illustrates a high-level view of the 5G network architecture, consisting of a Next Generation RAN (NG-RAN) 1399 and a 5G Core (5GC) 1398. NG-RAN 1399 can include a set gNBs connected to the 5GC via one or more NG interfaces, such as gNBs 1300, 1350 connected via interfaces 1302, 1352, respectively. In addition, the gNBs can be connected to each other via one or more Xn interfaces, such as Xn interface 1340 between gNBs 1300 and 1350.

NG-RAN 1399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB can be connected to all 5GC nodes within an "AMF Region," which is defined in 3GPP TS 23.501. If security protection for CP and UP data on TNL of NG-RAN interfaces is supported, NDS/IP (3GPP TS 33.401) can be applied.

The NG-RAN logical nodes shown in FIG. 13 (and described in TS 38.401 and TR 38.801) include a central (or centralized) unit (CU or gNB-CU) and one or more distributed (or decentralized) units (DU or gNB-DU). For example, gNB 1300 includes gNB-CU 1310 and gNB-DUs 1320 and 1330. CUs (e.g., gNB-CU 1310) are logical nodes that host higher-layer protocols and perform various gNB functions such controlling the operation of DUs. Similarly, each DU is a logical node that hosts lower-layer protocols and can include various subsets of the gNB functions, depending on the functional split. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 1322 and 232 shown in FIG. 3. The gNB-CU and connected gNB-DUs are only visible to other gNBs and 5GC 1398 as a gNB. In other words, the F1 interface is not visible beyond a gNB-CU.

Figure 14:
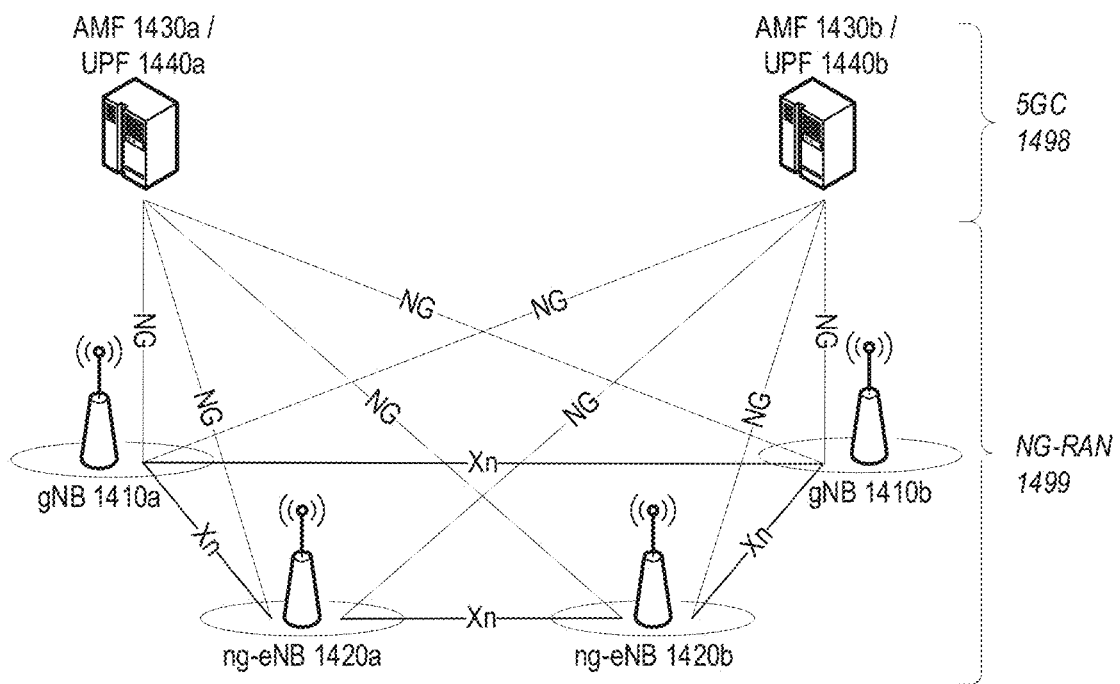

FIG. 14 shows a high-level view of an exemplary 5G network architecture, including a Next Generation Radio Access Network (NG-RAN) 1499 and a 5G Core (5GC) 1498. As shown in the figure, NG-RAN 1499 can include gNBs 1410 (e.g., 1410*a,b*) and ng-eNBs 1420 (e.g., 1420*a, b*) that are interconnected with each other via respective Xn interfaces. The gNBs and ng-eNBs are also connected via the NG interfaces to 5GC 1498, more specifically to the AMF (Access and Mobility Management Function) 1430 (e.g., AMFs 1430*a,b*) via respective NG-C interfaces and to the UPF (User Plane Function) 1440 (e.g., UPFs 1440*a,b*) via respective NG-U interfaces.

Each of the gNBs 1410 can support the NR radio interface, including frequency division duplexing (FDD), time division duplexing (TDD), or a combination thereof. In contrast, each of ng-eNBs 1420 supports the LTE radio interface but, unlike conventional LTE eNBs, connect to the 5GC via the NG interface.

Figure 15:
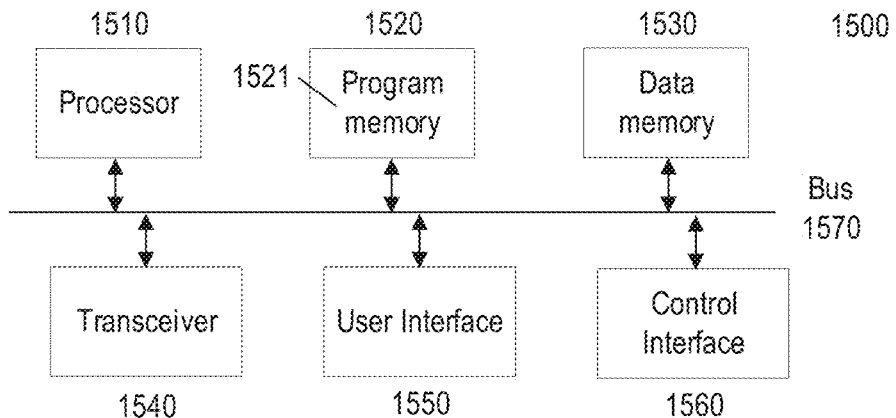
FIG. 15 illustrates a block diagram of an exemplary wireless communication device or UE configurable according to various exemplary embodiments of the present disclosure.

FIG. 15 shows a block diagram of an exemplary wireless device or user equipment (UE) configurable according to various exemplary embodiments of the present disclosure, including by execution of instructions on a computer-readable medium that correspond to, or comprise, any of the exemplary methods and/or procedures described above.

Exemplary device 1500 can comprise a processor 1510 that can be operably connected to a program memory 1520 and/or a data memory 1530 via a bus 1570 that can comprise parallel address and data buses, serial ports, or other methods and/or structures known to those of ordinary skill in the art. Program memory 1520 can store software code, programs, and/or instructions (collectively shown as computer program product 1521 in FIG. 15) executed by processor 1510 that can configure and/or facilitate device 1500 to perform various operations, including operations described below. For example, execution of such instructions can configure and/or facilitate exemplary device 1500 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with transceiver 1540, user interface 1550, and/or host interface 1560.

As another example, processor 1510 can execute program code stored in program memory 1520 that corresponds to MAC, RLC, PDCP, and RRC layer protocols standardized by 3GPP (e.g., for NR and/or LTE). As a further example, processor 1510 can execute program code stored in program memory 1520 that, together with transceiver 1540, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

Program memory 1520 can also comprises software code executed by processor 1510 to control the functions of device 1500, including configuring and controlling various components such as transceiver 1540, user interface 1550, and/or host interface 1560. Program memory 1520 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1520 can comprise an external storage arrangement (not shown) remote from device 1500, from which the instructions can be downloaded into program memory 1520 located within or removably coupled to device 1500, so as to enable execution of such instructions.

Data memory 1530 can comprise memory area for processor 1510 to store variables used in protocols, configuration, control, and other functions of device 1500, including operations corresponding to, or comprising, any of the exemplary methods and/or procedures described herein. Moreover, program memory 1520 and/or data memory 1530 can comprise non-volatile memory (e.g., flash memory), volatile memory (e.g., static or dynamic RAM), or a combination thereof. Furthermore, data memory 1530 can comprise a memory slot by which removable memory cards in one or more formats (e.g., SD Card, Memory Stick, Compact Flash, etc.) can be inserted and removed. Persons of ordinary skill in the art will recognize that processor 1510 can comprise multiple individual processors (including, e.g., multi-core processors), each of which implements a portion of the functionality described above. In such cases, multiple individual processors can be commonly connected to program memory 1520 and data memory 1530 or individually connected to multiple individual program memories and or data memories. More generally, persons of ordinary skill in the art will recognize that various protocols and other functions of device 1500 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A transceiver 1540 can comprise radio-frequency transmitter and/or receiver circuitry that facilitates the device 1500 to communicate with other equipment supporting like wireless communication standards and/or protocols. In some exemplary embodiments, the transceiver 1540 includes a transmitter and a receiver that enable device 1500 to communicate with various 5G/NR networks according to various protocols and/or methods proposed for standardization by 3GPP and/or other standards bodies. For example, such functionality can operate cooperatively with processor 1510 to implement a PHY layer based on OFDM, OFDMA, and/or SC-FDMA technologies, such as described herein with respect to other figures.

In some exemplary embodiments, the transceiver 1540 includes an LTE transmitter and receiver that can facilitate the device 1500 to communicate with various LTE LTE-Advanced (LTE-A), and/or NR networks according to standards promulgated by 3GPP. In some exemplary embodiments of the present disclosure, the transceiver 1540 includes circuitry, firmware, etc. necessary for the device 1500 to communicate with various 5G/NR, LTE, LTE-A, UMTS, and/or GSM/EDGE networks, also according to 3GPP standards. In some exemplary embodiments of the present disclosure, transceiver 1540 includes circuitry, firmware, etc. necessary for the device 1500 to communicate with various CDMA2000 networks, according to 3GPP2 standards.

In some exemplary embodiments of the present disclosure, the transceiver 1540 is capable of communicating using radio technologies that operate in unlicensed frequency bands, such as IEEE 802.11 WiFi that operates using frequencies in the regions of 2.4, 5.6, and/or 60 GHz. In some exemplary embodiments of the present disclosure, transceiver 1540 can comprise a transceiver that is capable of wired communication, such as by using IEEE 802.3 Ethernet technology. The functionality particular to each of these embodiments can be coupled with or controlled by other circuitry in the device 1500, such as the processor 1510 executing program code stored in program memory 1520 in conjunction with, or supported by, data memory 1530.

User interface 1550 can take various forms depending on the particular embodiment of device 1500, or can be absent from device 1500 entirely. In some exemplary embodiments, user interface 1550 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the device 1500 can comprise a tablet computing device including a larger touchscreen display. In such embodiments, one or more of the mechanical features of the user interface 1550 can be replaced by comparable or functionally equivalent virtual user interface features (e.g., virtual keypad, virtual buttons, etc.) implemented using the touchscreen display, as familiar to persons of ordinary skill in the art. In other embodiments, the device 1500 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the device 1500 having a touch screen display are capable of receiving user inputs, such as inputs related to exemplary methods and/or procedures described herein or otherwise known to persons of ordinary skill in the art.

In some exemplary embodiments of the present disclosure, device 1500 can comprise an orientation sensor, which can be used in various ways by features and functions of device 1500. For example, the device 1500 can use outputs of the orientation sensor to determine when a user has changed the physical orientation of the device 1500's touch screen display. An indication signal from the orientation sensor can be available to any application program executing on the device 1500, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1560 of the device 1500 can take various forms depending on the particular exemplary embodiment of device 1500 and of the particular interface requirements of other devices that the device 1500 is intended to communicate with and/or control. For example, the control interface 1560 can comprise an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1560 can comprise an IEEE 802.3 Ethernet interface such as described above. In some exemplary embodiments of the present disclosure, the control interface 1560 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 1500 can comprise more functionality than is shown in FIG. 15 including, for example, a video and/or still-image camera, microphone, media player and/or recorder, etc. Moreover, transceiver 1540 can include circuitry necessary to communicate using additional radio-frequency communication standards including Bluetooth, GPS, and/or others. Moreover, the processor 1510 can execute software code stored in the program memory 1520 to control such additional functionality. For example, directional velocity and/or position estimates output from a GPS receiver can be available to any application program executing on the device 1500, including various exemplary methods and/or computer-readable media according to various exemplary embodiments of the present disclosure.

Figure 16:
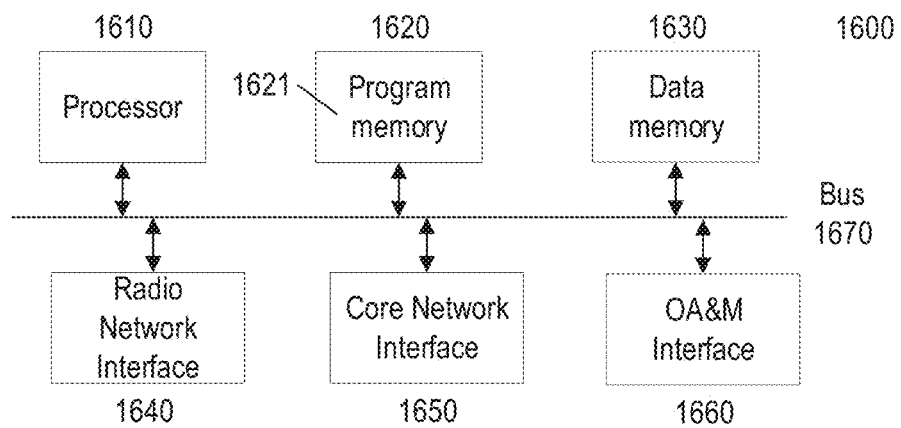
FIG. 16 illustrates a block diagram of an exemplary network node configurable according to various exemplary embodiments of the present disclosure.

FIG. 16 shows a block diagram of an exemplary network node 1600 configurable according to various embodiments of the present disclosure, including those described above with reference to other figures. In some exemplary embodiments, network node 1600 can comprise a base station, eNB, gNB, or component thereof. Network node 1600 comprises processor 1610 which is operably connected to program memory 1620 and data memory 1630 via bus 1670, which can comprise parallel address and data buses, serial ports, or other methods and/or structures known to those of ordinary skill in the art.

Program memory 1620 can store software code, programs, and/or instructions (collectively shown as computer program product 1621 in FIG. 16) executed by processor 1610 that can configure and/or facilitate network node 1600 to perform various operations, including operations described below. For example, execution of such stored instructions can configure network node 1600 to communicate with one or more other devices using protocols according to various embodiments of the present disclosure, including one or more exemplary methods and/or procedures discussed above. Furthermore, execution of such stored instructions can also configure and/or facilitate network node 1600 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1640 and core network interface 1650. By way of example and without limitation, core network interface 1650 can comprise the S1 interface and radio network interface 1650 can comprise the Uu interface, as standardized by 3GPP. Program memory 1620 can also include software code executed by processor 1610 to control the functions of network node 1600, including configuring and controlling various components such as radio network interface 1640 and core network interface 1650.

Data memory 1630 can comprise memory area for processor 1610 to store variables used in protocols, configuration, control, and other functions of network node 1600. As such, program memory 1620 and data memory 1630 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1610 can comprise multiple individual processors (not shown), each of which implements a portion of the functionality described above. In such case, multiple individual processors may be commonly connected to program memory 1620 and data memory 1630 or individually connected to multiple individual program memories and/or data memories. More generally, persons of ordinary skill in the art will recognize that various protocols and other functions of network node 1600 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1640 can comprise transmitters, receivers, signal processors, ASICs, antennas, beamforming units, and other circuitry that enables network node 1600 to communicate with other equipment such as, in some embodiments, a plurality of compatible user equipment (UE). In some exemplary embodiments, radio network interface can comprise various protocols or protocol layers, such as the PHY, MAC, RLC, PDCP, and RRC layer protocols standardized by 3GPP for LTE, LTE-A, and/or 5G/NR; improvements thereto such as described herein above; or any other higher-layer protocols utilized in conjunction with radio network interface 1640. According to further exemplary embodiments of the present disclosure, the radio network interface 1640 can comprise a PHY layer based on OFDM, OFDMA, and/or SC-FDMA technologies. In some embodiments, the functionality of such a PHY layer can be provided cooperatively by radio network interface 1640 and processor 1610 (including program code in memory 1620).

Core network interface 1650 can comprise transmitters, receivers, and other circuitry that enables network node 1600 to communicate with other equipment in a core network such as, in some embodiments, circuit-switched (CS) and/or packet-switched Core (PS) networks. In some embodiments, core network interface 1650 can comprise the S1 interface standardized by 3GPP. In some exemplary embodiments, core network interface 1650 can comprise one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of core network interface 1650 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

OA&M interface 1660 can comprise transmitters, receivers, and other circuitry that enables network node 1600 to communicate with external networks, computers, databases, and the like for purposes of operations, administration, and maintenance of network node 1600 or other network equipment operably connected thereto. Lower layers of OA&M interface 1660 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1640, core network interface 1650, and OA&M interface 1660 may be multiplexed together on a single physical interface, such as the examples listed above.

Figure 17:
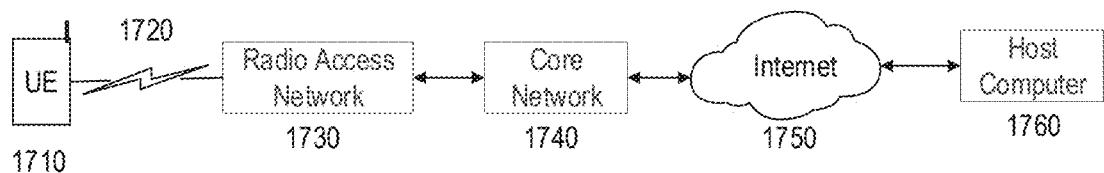
FIG. 17 illustrates a block diagram of an exemplary network configuration usable to provide over-the-top (OTT) data services between a host computer and a UE, according to various exemplary embodiments of the present disclosure.

FIG. 17 is a block diagram of an exemplary network configuration usable to provide over-the-top (OTT) data services between a host computer and a user equipment (UE), according to one or more exemplary embodiments of the present disclosure. UE 1710 can communicate with radio access network (RAN) 1730 over radio interface 1720, which can be based on protocols described above including, e.g., LTE, LTE-A, and 5G/NR. RAN 1730 can include one or more network nodes (e.g., base stations, eNBs, gNBs, controllers, etc.). RAN 1730 can further communicate with core network 1740 according to various protocols and interfaces described above. For example, one or more apparatus (e.g., base stations, eNBs, gNBs, etc.) comprising RAN 1730 can communicate to core network 1740 via core network interface 1650 described above. In some exemplary embodiments, RAN 1730 and core network 1740 can be configured and/or arranged as shown in other figures discussed above. Similarly, UE 1710 can also be configured and/or arranged as shown in other figures discussed above.

Core network 1740 can further communicate with an external packet data network, illustrated in FIG. 17 as Internet 1750, according to various protocols and interfaces known to persons of ordinary skill in the art. Many other devices and/or networks can also connect to and communicate via Internet 1750, such as exemplary host computer 1760. In some exemplary embodiments, host computer 1760 can communicate with UE 1710 using Internet 1750, core network 1740, and RAN 1730 as intermediaries. Host computer 1760 can be a server (e.g., an application server) under ownership and/or control of a service provider. Host computer 1760 can be operated by the OTT service provider or by another entity on the service provider's behalf.

For example, host computer 1760 can provide an over-the-top (OTT) packet data service to UE 1710 using facilities of core network 1740 and RAN 1730, which can be unaware of the routing of an outgoing/incoming communication to/from host computer 1760. Similarly, host computer 1760 can be unaware of routing of a transmission from the host computer to the UE, e.g., the routing of the transmission through RAN 1730. Various OTT services can be provided using the exemplary configuration shown in FIG. 17 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 17 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide an efficient technique to signal a spatial relation for Physical Uplink Control Channel (PUCCH) resources (e.g., via a MAC-CE message) to be used by UE 1710 when communicating with a network node (e.g., gNB) comprising RAN 1730. For example, such techniques can flexibly signal whether a spatial relation should apply to a single PUCCH resource, or to a plurality of PUCCH resources, such as to all configured PUCCH resources or to a group, set, and/or subset of all configured PUCCH resources. When used in NR UEs (e.g., UE 1710) and gNBs (e.g., gNBs comprising RAN 1730) supporting spatial relation functionality, such exemplary embodiments can provide various improvements, benefits, and/or advantages including reduced RS overhead required for beam management in downlink and/or uplink; more efficient signaling of spatial relations for multiple resources; better support for decoupled uplink/downlink implementations; and reduced energy consumption for RS transmission and/or reception. As such, the improvements, as described herein, can play a critical role by enabling UE 1710 and RAN 1730 to meet the requirements of the particular OTT service between host computer 1760 and UE 1710. These techniques improve data throughput in a coverage area and enable a greater number of users to utilize data-intensive services such as streaming video in various coverage conditions without excessive power consumption or other degradations to user experience. As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The term "network node" used herein can be any kind of network node in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment.

As used herein, a "radio access node" (or "radio network node") can be any node in a radio access network (RAN) that operates to wirelessly transmit and/or receive signals. Some examples of radio access nodes include, but are not limited to, a base station (e.g., a New Radio (NR) base station (gNB) in a 3GPP Fifth Generation (5G) NR network or an eNB in a 3GPP LTE network), a high-power or macro base station, a low-power base station (e.g., a micro base station, a pico base station, a home eNB, or the like), a relay node, access point (AP), radio AP, remote radio unit (RRU), remote radio head (RRH), a multi-standard BS (e.g., MSR BS), multi-cell/multicast coordination entity (MCE), base transceiver station (BTS), base station controller (BSC), network controller, NodeB (NB), etc. Such terms can also be used to reference to components of a node, such as a gNB-CU and/or a gNB-DU.

As used herein, the term "radio node" can refer to a wireless device (WD) or a radio network node.

As used herein, a "core network node" can be any type of node in a core network. Some examples of a core network node include, e.g., a Mobility Management Entity (MME), a Packet Data Network Gateway (P-GW), a Service Capability Exposure Function (SCEF), Access and Mobility Management Function (AMF), User Plane Function (UPF), Home Subscriber Server (HSS), etc.

As used herein, a "network node" is any node that is part of a radio access network (e.g., a "radio network node" or "radio access node") or a core network (e.g., a "core network node") of a wireless communication system, such as a cellular communications network/system.

In some embodiments, the non-limiting terms "wireless device" (WD) or "user equipment" (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine-to-machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, the term "slot" is used to indicate a radio resource; however, it should be understood that the techniques described herein may advantageously be used with other types of radio resources, such as any type of physical resource or radio resource expressed in terms of length of time. Examples of time resources include symbols, time slots, mini-slots, subframes, radio frames, transmission time intervals (TTIs), interleaving times, time resource numbers, etc.

In some embodiments, a transmitter (e.g., network node) and a receiver (e.g., WD) previously agrees on rule(s) for determining for which resources the transmitter and receiver will arrange one or more physical channels during transmission of the resources, and this rule may, in some embodiments, be referred to as "mapping." In other embodiments, the term "mapping" may have other meanings.

As used herein, a "channel" can be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel (e.g., PDSCH), in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the concepts, principles, and/or embodiments described herein.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art.

Example embodiments of the techniques and apparatus described herein include, but are not limited to, the following enumerated examples:

1. A method for a network node to activate or deactivate reference signal (RS) resources usable for management of transmit and/or receive beams for communication with a user equipment (UE) in a wireless communication network, the method comprising:
   sending, to the UE, one or more control messages comprising configuration of a plurality of RS resources associated with a cell in the wireless communication network, wherein the plurality of RS resources are further associated with a particular bandwidth part (BWP) of a particular component carrier (CC) of the cell; and
   sending, to the UE, a further control message comprising:
      identification of at least a portion of the plurality of RS resources to be activated or deactivated;
      in relation to each particular RS resource of the identified resources, an indication of whether the particular RS resource has a spatial relation with at least one of a BWP and a CC, other than the particular BWP of the particular CC.

2. The method of exemplary embodiment 1, further comprising:
   determining one or more spatial relations between:
      one or more RS resources associated with the particular BWP of the particular CC; and
      one or more RS resources associated with one or more further CCs, one or more BWPs of the particular CC, and one or more BWPs of one or more further CCs.

3. The method of exemplary embodiment 1, wherein the identification of at least a portion of the plurality of RS resources comprises, in relation to each particular RS resource of the identified RS resources, a respective RS resource identifier.

4. The method of exemplary embodiment 3, wherein the further control message comprises an identification of the particular BWP and the particular CC.

5. The method of exemplary embodiment 3, wherein the indication of whether the particular RS resource has a spatial relation comprises an identifier associated with one of: the particular BWP of the particular CC, a further BWP of the particular CC, a further component carrier, and a further BWP of a further CC.

6. The method of exemplary embodiment 3, wherein whether the particular RS resource has a spatial relation is indicated by a single identifier, associated with all identified resources, that identifies one of: the particular BWP of the particular CC, a further BWP of the particular CC, a further component carrier, and a further BWP of a further CC.

7. The method of exemplary embodiment 6, wherein whether the particular RS resource has the spatial relation indicated by the single identifier is further determined by the value of a corresponding bit in a bitmap comprising the further control message.

8. The method of exemplary embodiment 4, wherein:
   the one or more control messages further comprise a plurality of CC-BWP combination identifiers, each combination identifier being associated with at least one of a different BWP and a different CC, than the other combination identifiers of the plurality; and whether the particular RS resource has a spatial relation is indicated by an index associated with all identified resources and having a value indicating a particular one of the CC-BWP combination identifiers.

9. The method of exemplary embodiment 8, wherein one value of the index indicates that all identified RS resources are associated with particular BWP and the particular CC identified in the further control message.

10. The method of exemplary embodiment 4, wherein:
the one or more control messages further comprise a plurality of spatial relations associated with at least one of: one or more RS resources associated with the particular BWP of the particular CC, one or more further CCs, one or more BWPs of the particular CC, and one or more BWPs of one or more further CCs; and
the further control message comprises a bit whose value indicates that each of the RS resources to be activated or deactivated is identified based on one of:
a corresponding index having a value indicating a particular one of the plurality of spatial relations comprising the one or more control messages; and
a corresponding RS resource identifier comprising the further control message.

11. The method of exemplary embodiment 10, wherein the plurality of spatial relations are further associated with Physical Uplink Control Channel (PUCCH) resources.

12. The method of exemplary embodiment 10, wherein each of the plurality of spatial relations comprises a Transmission Configuration Indicator (TCI) state identifier associated with a particular CC-BWP combination and a particular downlink (DL) RS.

13. The method of exemplary embodiment 1, wherein the method further comprises: if the further control message identifies the at least a portion of the RS resources to be activated, performing a procedure, using the identified RS resources, for management of transmit and/or receive beams for communication with the UE.

14. A method for a user equipment (UE) to activate or deactivate reference signal (RS) resources usable for management of transmit and/or receive beams for communication with a network node in a wireless communication network, the method comprising:
receiving, from the network node, one or more control messages comprising configuration of a plurality of RS resources associated with a cell in the wireless communication network, wherein the plurality of RS resources are further associated with a particular bandwidth part (BWP) of a particular component carrier (CC) of the cell; and
receiving, from the network node, a further control message comprising:
identification of at least a portion of the plurality of RS resources to be activated or deactivated;
in relation to each particular RS resource of the identified resources, an indication of whether the particular RS resource has a spatial relation with at least one of a BWP and a CC, other than the particular BWP of the particular CC.

15. The method of exemplary embodiment 14, wherein the identification of at least a portion of the plurality of RS resources comprises, in relation to each particular RS resource of the identified RS resources, a respective RS resource identifier.

16. The method of exemplary embodiment 15, wherein the further control message comprises an identification of the particular BWP and the particular CC.

17. The method of exemplary embodiment 15, wherein the indication of whether the particular RS resource has a spatial relation comprises an identifier associated with one of: the particular BWP of the particular CC, a further BWP of the particular CC, a further component carrier, and a further BWP of a further CC.

18. The method of exemplary embodiment 15, wherein whether the particular RS resource has a spatial relation is indicated by a single identifier, associated with all identified resources, that identifies one of: the particular BWP of the particular CC, a further BWP of the particular CC, a further component carrier, and a further BWP of a further CC.

19. The method of exemplary embodiment 18, wherein whether the particular RS resource has the spatial relation indicated by the single identifier is further determined by the value of a corresponding bit in a bitmap comprising the further control message.

20. The method of exemplary embodiment 16, wherein:
the one or more control messages further comprise a plurality of CC-BWP combination identifiers, each combination identifier being associated with at least one of a different BWP and a different CC, than the other combination identifiers of the plurality; and
whether the particular RS resource has a spatial relation is indicated by an index associated with all identified resources and having a value indicating a particular one of the CC-BWP combination identifiers.

21. The method of exemplary embodiment 20, wherein one value of the index indicates that all identified RS resources are associated with particular BWP and the particular CC identified in the further control message.

22. The method of exemplary embodiment 16, wherein:
the one or more control messages further comprise a plurality of spatial relations associated with at least one of: one or more RS resources associated with the particular BWP of the particular CC, one or more further CCs, one or more BWPs of the particular CC, and one or more BWPs of one or more further CCs; and
the further control message comprises a bit whose value indicates that each of the RS resources to be activated or deactivated is identified based on one of:
a corresponding index having a value indicating a particular one of the plurality of spatial relations comprising the one or more control messages; and
a corresponding RS resource identifier comprising the further control message.

23. The method of exemplary embodiment 22, wherein the plurality of spatial relations are further associated with Physical Uplink Control Channel (PUCCH) resources.

24. The method of exemplary embodiment 22, wherein each of the plurality of spatial relations comprises a Transmission Configuration Indicator (TCI) state identifier associated with a particular CC-BWP combination and a particular downlink (DL) RS.

25. The method of exemplary embodiment 14, wherein the method further comprises: if the further control message identifies the at least a portion of the RS resources to be activated, performing a procedure, using the identified RS resources, for management of transmit and/or receive beams for communication with the network node.

26. A network node arranged to activate or deactivate reference signal (RS) resources usable for management of transmit and/or receive beams for communication with a user equipment (UE) in a wireless communication network, the network node comprising:
communication circuitry configured for communicating with one or more UEs; and processing circuitry operatively associated with the communication circuitry and configured to perform operations corresponding to the methods of any of exemplary embodiments 1-13.

27. A user equipment (UE) arranged to activate or deactivate reference signal (RS) resources usable for management of transmit and/or receive beams for communication with a network node in a wireless communication network, the UE comprising:
communication circuitry configured for communicating with the network node; and
processing circuitry operatively associated with the communication circuitry and configured to perform operations corresponding to the methods of any of exemplary embodiments 14-25.

28. A non-transitory, computer readable medium storing computer-executable instructions that, when executed by at least one processor of a network node arranged to activate or deactivate reference signal (RS) resources usable for management of transmit and/or receive beams for communication with a user equipment (UE) in a wireless communication network, configure the network node to perform operations corresponding to the methods of any of exemplary embodiments 1-13.

29. A non-transitory, computer readable medium storing computer-executable instructions that, when executed by at least one processor of a user equipment (UE) arranged to activate or deactivate reference signal (RS) resources usable for management of transmit and/or receive beams for communication with a network node in a wireless communication network, configure the UE to perform operations corresponding to the methods of any of exemplary embodiments 14-25.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms can be employed herein, they are used in a generic and descriptive sense only and not for purposes of limitation.

The invention claimed is:

1. A method for a network node, in a wireless communication network, to activate semi-persistent sounding reference signal (SP-SRS) resources for transmission by a user equipment (UE), the method comprising:
sending, to the UE, a radio resource control (RRC) message comprising a configuration of a set of SP-SRS resources for UE transmission in a first serving cell of the wireless communication network; and
sending, to the UE, a medium access control (MAC) control element (CE) message for activating the configured set of SP-SRS resources, the MAC CE message comprising:
information identifying an SP-SRS resource of the set of SP-SRS resources to be activated, and
an indication of the identified SP-SRS resource's spatial relation with a further resource on a second serving cell different from the first serving cell, wherein the indication comprises an identifier of the further resource and an identifier of the second serving cell.

2. The method of claim 1, wherein the further resource is one of the following: a synchronization signal/physical broadcast control channel block (SSB) resource; a channel state information reference signal (CSI-RS) resource; or a sounding reference signal (SRS) resource not included in the set of SP-SRS resources.

3. The method of claim 1, wherein the MAC CE message comprises an identification of the set of SP-SRS resources.

4. The method of claim 1, wherein the information identifying the SP-SRS resource comprises an RS resource identifier.

5. The method of claim 1, wherein the MAC CE message comprises an identification of the first serving cell, with the identification of the first serving cell being associated with all SP-SRS resources of the set of SP-SRS resources.

6. The method of claim 1, further comprising receiving from the UE an SP-SRS resource of the set of SP-SRS resources.

7. A method for a user equipment (UE) to transmit a semi-persistent sounding reference signal (SP-SRS) resource to a network node in a wireless communication network, the method comprising:
receiving, from the network node, a radio resource control (RRC) message comprising a configuration of a set of SP-SRS resources for transmission in a first serving cell of the wireless communication network;
receiving, from the network node, a medium access control (MAC) control element (CE) message for activating the configured set of SP-SRS resources, the MAC CE message comprising:
information identifying an SP-SRS resource of the set of SP-SRS resources to be activated, and the method being characterized in that the MAC CE message comprises:
an indication of the identified SP-SRS resource's spatial relation with a further resource on a second serving cell different from the first serving cell, wherein the indication comprises an identifier of the further resource and an identifier of the second serving cell; and
transmitting the identified SP-SRS resource using a same spatial domain filter as used to receive or transmit the further resource.

8. The method of claim 7, wherein the further resource is one of the following: a synchronization signal/physical broadcast control channel block (SSB) resource; a channel state information reference signal (CSI-RS) resource; or a sounding reference signal (SRS) resource not included in the set of SP-SRS resources.

9. The method of claim 7, wherein the MAC CE message comprises an identification of the set of SP-SRS resources.

10. The method of claim 7, wherein the information identifying the SP-SRS resource comprises an RS resource identifier.

11. The method claim 7, wherein the MAC CE message comprises an identification of the first serving cell, with the identification of the first serving cell being associated with all SP-SRS resources of the set of SP-SRS resources.

12. A network node configured to operate in a wireless communication network and to activate semi-persistent sounding reference signal (SP-SRS) resources for transmission by a user equipment (UE), the network node comprising:
a radio network interface configured for communicating with one or more UEs; and
processing circuitry operatively coupled to the radio network interface, whereby the processing circuitry and the radio network interface are configured to:

send, to the UE, a radio resource control (RRC) message comprising configuration of a set of SP-SRS resources for UE transmission in a first serving cell of the wireless communication network; and send, to the UE, a medium access control (MAC) control element (CE) message for activating the configured set of SP-SRS resources, the MAC CE message comprising:

information identifying an SP-SRS resource of the set of SP-SRS resources to be activated, and an indication of the identified SP-SRS resource's spatial relation with a further resource on a second serving cell different from the first serving cell, wherein the indication comprises an identifier of the further resource and an identifier of the second serving cell.

13. The network node of claim 12, wherein the further resource is one of the following: a synchronization signal/physical broadcast control channel block (SSB) resource; a channel state information reference signal (CSI-RS) resource; or a sounding reference signal (SRS) resource not included in the set of SP-SRS resources.

14. The network node of claim 12, wherein the MAC CE message comprises one of the following:

an identification of the set of SP-SRS resources, or an identification of the first serving cell, with the identification of the first serving cell being associated with all SP-SRS resources of the set of SP-SRS resources.

15. The network node of claim 12, wherein the information identifying the SP-SRS resource comprises an RS resource identifier.

16. The network node of claim 12, wherein the processing circuitry and the radio network interface are further configured to receive from the UE an SP-SRS resource of the set of SP-SRS resources.

17. A user equipment (UE) configured to transmit a semi-persistent sounding reference signal (SP-SRS) resource to a network node in a wireless communication network, the UE comprising:

transceiver circuitry configured for communicating with the network node; and processing circuitry operatively coupled to the transceiver circuitry, whereby the processing circuitry and the transceiver circuitry are configured to:

receive, from the network node, a radio resource control (RRC) message comprising a configuration of a set of SP-SRS resources for transmission in a first serving cell of the wireless communication network;

receive, from the network node, a medium access control (MAC) control element (CE) message for activating the configured set of SP-SRS resources, the MAC CE message comprising:

information identifying an SP-SRS resource of the set of SP-SRS resources to be activated, and an indication of the identified SP-SRS resource's spatial relation with a further resource on a second serving cell different from the first serving cell, wherein the indication comprises an identifier of the further resource and an identifier of the second serving cell; and transmit the identified SP-SRS resource using a same spatial domain filter as used to receive or transmit the further resource.

18. The UE of claim 17, wherein the further resource is one of the following: a synchronization signal/physical broadcast control channel block (SSB) resource; a channel state information reference signal (CSI-RS) resource; or a sounding reference signal (SRS) resource not included in the set of SP-SRS resources.

19. The UE of claim 17, wherein the MAC CE message comprises one of the following:

an identification of the set of SP-SRS resources, or an identification of the first serving cell, with the identification of the first serving cell being associated with all SP-SRS resources of the set of SP-SRS resources.

20. The UE of claim 17, wherein the information identifying the SP-SRS resource comprises an RS resource identifier.

* * * * *

UNITED STATES PATENT AND TRADEMARK OFFICE
CERTIFICATE OF CORRECTION

PATENT NO. : 11,902,217 B2
APPLICATION NO. : 17/959409
DATED : February 13, 2024
INVENTOR(S) : Grant et al.

It is certified that error appears in the above-identified patent and that said Letters Patent is hereby corrected as shown below:

In the Specification

In Column 5, Line 4, delete "(SS/PBCH)" and insert -- (SS/PBCCH) --, therefor.

In Column 10, Line 39, delete "$F_i$" and insert -- $F_1$ --, therefor.

In Column 17, Lines 66-67, delete "host interface 1560." and insert -- control interface 1560. --, therefor.

In Column 18, Line 15, delete "host interface 1560." and insert -- control interface 1560. --, therefor.

In Column 24, Line 22, delete "multi-standard" and insert -- multi-standard radio --, therefor.

In Column 24, Line 52, delete "equipped" and insert -- equipment --, therefor.

Signed and Sealed this
Sixteenth Day of July, 2024

Katherine Kelly Vidal
*Director of the United States Patent and Trademark Office*